(12) United States Patent
Zhu et al.

(10) Patent No.: US 11,962,495 B2
(45) Date of Patent: Apr. 16, 2024

(54) DATA TRANSMISSION METHOD AND SYSTEM

(71) Applicant: Alibaba Group Holding Limited, Grand Cayman (KY)

(72) Inventors: Shunmin Zhu, Hangzhou (CN);
Weiting Huang, Hangzhou (CN);
Jianyong Chen, Beijing (CN)

(73) Assignee: Alibaba Group Holding Limited, George Town (KY)

( * ) Notice: Subject to any disclaimer, the term of this patent is extended or adjusted under 35 U.S.C. 154(b) by 254 days.

(21) Appl. No.: 17/190,241

(22) Filed: Mar. 2, 2021

(65) Prior Publication Data

US 2021/0184968 A1    Jun. 17, 2021

Related U.S. Application Data

(63) Continuation of application No. PCT/CN2019/102701, filed on Aug. 27, 2019.

(30) Foreign Application Priority Data

Sep. 3, 2018 (CN) .......................... 201811021344.5

(51) Int. Cl.
*H04L 45/50* (2022.01)
*H04L 12/46* (2006.01)
(Continued)

(52) U.S. Cl.
CPC .......... *H04L 45/50* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS

| 7,564,802 B2 | 7/2009 | Andrapalliyal et al. |
| 7,778,248 B2 | 8/2010 | Scudder et al. |

(Continued)

FOREIGN PATENT DOCUMENTS

| CN | 102025600 A | 4/2011 |
| CN | 103067290 A | 4/2013 |

(Continued)

OTHER PUBLICATIONS

Translation of CN Office Action dated Feb. 25, 2022, from corresponding CN Patent Application No. 201811021344.5, 9 pages.

(Continued)

*Primary Examiner* — Christine T Duong
(74) *Attorney, Agent, or Firm* — Lee & Hayes P.C.

(57) ABSTRACT

A system including a transmission terminal, used for transmitting a target data packet obtained by encrypting and encapsulating a data flow; a network controller, deployed in a first Internet network and storing routing information from the transmission terminal to a receiving terminal; and a backbone transmission network device, deployed in a backbone transmission network and used for obtaining the routing information and the target data packet forwarded by the first Internet network and forwarding the target data packet to the receiving terminal based on the routing information. The present disclosure solves the technical problem of low efficiency and high cost of data transmission in the conventional techniques.

20 Claims, 11 Drawing Sheets

(51) Int. Cl.
  *H04L 45/02* (2022.01)
  *H04L 9/40* (2022.01)

(52) U.S. Cl.
  CPC .......... *H04L 45/04* (2013.01); *H04L 63/0428* (2013.01); *H04L 2212/00* (2013.01)

(56) References Cited

U.S. PATENT DOCUMENTS

| | | | |
|---|---|---|---|
| 7,907,595 | B2 | 3/2011 | Khanna et al. |
| 8,189,481 | B2 | 5/2012 | Ravindran et al. |
| 8,189,585 | B2 | 5/2012 | Dharwadkar et al. |
| 8,194,664 | B2 | 6/2012 | Dharwadkar |
| 8,316,435 | B1 | 11/2012 | Varadhan et al. |
| 8,488,614 | B1 * | 7/2013 | Aggarwal ............... H04L 45/50 370/464 |
| 9,077,587 | B2 | 7/2015 | Hines et al. |
| 10,524,124 | B2 | 12/2019 | Black et al. |
| 2004/0252722 | A1 | 12/2004 | Wybenga et al. |
| 2008/0080517 | A1 | 4/2008 | Roy et al. |
| 2010/0043068 | A1 | 2/2010 | Varadhan et al. |
| 2010/0316056 | A1 | 12/2010 | Unbehagen et al. |
| 2014/0052877 | A1 | 2/2014 | Mao |

FOREIGN PATENT DOCUMENTS

| | | | | |
|---|---|---|---|---|
| CN | 104184646 | A | 12/2014 | |
| CN | 106685903 | A | 5/2017 | |
| CN | 107925575 | A | 4/2018 | |
| CN | 108111413 | A | 6/2018 | |
| WO | WO-2011079717 | A1 * | 7/2011 | ......... H04L 12/4633 |
| WO | WO2017113344 | A1 | 7/2017 | |

OTHER PUBLICATIONS

Translation of CN Office Action dated Aug. 13, 2021, from corresponding CN Patent Application No. 201811021344.5, 8 pages.
Translation of CN Search Report dated Aug. 7, 2021, from corresponding CN Patent Application No. 201811021344.5, 2 pages.
Translation of International Search Report dated Nov. 27, 2019, from corresponding PCT Application No. PCT/CN2019/102701, 2 pages.
Translation of Written Opinion dated Nov. 27, 2019, from corresponding PCT Application No. PCT/CN2019/102701, 4t pages.
Translation of CN Office Action mailed Oct. 21, 2022, from corresponding CN Patent Application No. 201811021344.5, 9 pages.
Translation of CN Office Action mailed Aug. 10, 2022, from corresponding CN Patent Application No. 201811021344.5, 8 pages.
Translation of CN Search Report mailed Aug. 5, 2022, from corresponding CN Patent Application No. 201811021344.5, 2 pages.

* cited by examiner

DATA TRANSMISSION METHOD AND SYSTEM

CROSS REFERENCE TO RELATED APPLICATIONS

This application claims priority to and is a continuation of PCT Patent Application No. PCT/CN2019/102701, filed on 27 Aug. 2019 and entitled "DATA TRANSMISSION METHOD AND SYSTEM," which claims priority to Chinese Patent Application No. 201811021344.5, filed on 3 Sep. 2018 and entitled "DATA TRANSMISSION METHOD AND SYSTEM," which are incorporated herein by reference in their entirety.

TECHNICAL FIELD

The present disclosure relates to the field of cloud computing technology, and, more particularly, to data transmission methods and systems.

BACKGROUND

A main solution for enterprises using cloud computing technology is to use a hybrid cloud architecture. The hybrid cloud uses not only the security and controllability of a private cloud to store important internal data, such as a main database deployed in a local data center, but also the flexible computing resources of the public cloud, which has the advantage of pay-as-you-go and saves cost to possess the advantages of both the private cloud and the public cloud. A private connection is a basic fundamental composition of the hybrid cloud architecture. The private connection includes two solutions based on IPsec VPN (IPsec VPN is the abbreviation of Internet Protocol Security Virtual Private Network), dedicated line access. IPsec VPN is a data encryption tunnel based on pure Internet, and the two ends of the tunnel are composed of routers, firewalls and other dedicated devices. A dedicated line is a physical network connection provided by an ISP operator (ISP is the abbreviation of Internet Service Provider) or by a secondary network integrator, and generally is 2-layer Ethernet access (MSTP (Multi-Service Transfer Platform) line) or 3-layer access (MPLS (Multi-Protocol Label Switching) VPN). In most cases, the dedicated line is an exclusive line with high security.

However, the IPsec VPN-based solution has the problem that quality is not guaranteed, and the network and time lag are completely dependent on the Internet. In the case of long-distance transmission, especially under a cross-border scenario, the quality is very poor. The solution based on dedicated line access has a very high and opaque price. The monthly cost of the dedicated lines in the same city is about $150 per megabyte and the inter-provincial dedicated lines are more expensive. In addition, the construction period is long, which, even if the resources are available, takes two weeks to one month. If there are no resources readily available or cross-border transmission is required, the construction will take more than three months. The construction also needs access to properties. Generally, only the major operators are qualified to sell MSTP lines, but they often build barriers to each other. When the client's property is monopolized by an operator, other operators are not accessible.

No effective solution has been proposed to address the low efficiency and high cost of the data transmission process in the conventional techniques.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Embodiments of the present disclosure provide data transmission methods and systems to solve at least the technical problems of the low efficiency and high cost of the data transmission process in the conventional techniques.

According to an embodiment of the present disclosure, a data transmission system is provided. The system comprises: a transmission terminal, used for transmitting a target data packet obtained by encrypting and encapsulating a data flow; a network controller, deployed in a first network such as a first Internet network and storing routing information from the transmission terminal to a receiving terminal; and a backbone transmission network device, deployed in a backbone transmission network and used for obtaining the routing information and the target data packet forwarded by the first Internet network and forwarding the target data packet to the receiving terminal based on the routing information.

According to an embodiment of the present disclosure, a data transmission method is further provided, comprising: a backbone transmission network device obtaining through a first Internet network a target data packet transmitted by a transmission terminal, wherein the target data packet is obtained by the transmission terminal by encrypting and encapsulating a data flow; the backbone transmission network device obtaining routing information from the transmission terminal to a receiving terminal transmitted by a network controller, wherein the network controller is deployed in the first Internet network; and the backbone transmission network device forwarding the target data packet to the receiving terminal based on the routing information.

According to an embodiment of the present disclosure, a data transmission method is further provided, comprising: a transmission terminal obtaining a data flow; the transmission terminal encrypting and encapsulating the data flow to obtain a target data packet; and the transmission terminal transmitting the target data packet to a backbone transmission network device through a first Internet network, wherein the backbone transmission network device forwards the target data packet to a receiving terminal based on routing information from the transmission terminal to the receiving terminal transmitted by a network controller, and the network controller is deployed in the first Internet network.

According to an embodiment of the present disclosure, a storage medium is further provided, including a stored program, wherein when the program is running, a device where the storage medium is located is controlled to perform the following acts: obtaining through a first Internet network a target data packet transmitted by a transmission terminal, wherein the target data packet is obtained by the transmission terminal by encrypting and encapsulating a data flow; obtaining routing information from the transmission terminal to a receiving terminal transmitted by a network controller, wherein the network controller is deployed in the first Internet network; and forwarding the target data packet to the receiving terminal based on the routing information.

According to an embodiment of the present disclosure, a processor is further provided, used for running a program, wherein when the program is running, the following acts are performed: obtaining through a first Internet network a target data packet transmitted by a transmission terminal, wherein the target data packet is obtained by the transmission terminal by encrypting and encapsulating a data flow; obtaining routing information from the transmission terminal to a receiving terminal transmitted by a network controller, wherein the network controller is deployed in the first Internet network; and forwarding the target data packet to the receiving terminal based on the routing information.

According to an embodiment of the present disclosure, a data processing system is further provided, comprising: a processor; and a memory connected to the processor and used for providing the processor with instructions for performing the following processing acts: obtaining through a first Internet network a target data packet transmitted by a transmission terminal, wherein the target data packet is obtained by the transmission terminal by encrypting and encapsulating a data flow; obtaining routing information from the transmission terminal to a receiving terminal transmitted by a network controller, wherein the network controller is deployed in the first Internet network; and forwarding the target data packet to the receiving terminal based on the routing information.

In an embodiment of the present disclosure, a network controller may be deployed in a first Internet network. The network controller stores routing information from a transmission terminal to a receiving terminal, a data flow is encrypted and encapsulated through the transmission terminal to obtain a target data packet, the target data packet is forwarded to a backbone transmission network through a first Internet network. Further, the backbone transmission network device may forward the target data packet to a receiving terminal based on the routing information, thereby achieving the purpose of an end-to-end enterprise virtual network.

Compared with the conventional techniques, encrypting and encapsulating a data flow through a transmission terminal and performing data forwarding through routing information provided by a network controller achieves automatic learning and automatic forwarding of routing. The client private network is configured automatically and does not need manual configuration; the complexity of routing configuration and maintenance is reduced significantly. No specific persons are needed for operation and maintenance; the quality is high. The technical effect of improving network quality, raising transmission efficiency and reducing network cost are achieved.

Therefore, the solutions of the embodiments of the present disclosure solve the technical problem of the low efficiency and high cost of the data transmission process in the conventional techniques.

BRIEF DESCRIPTION OF DRAWINGS

To describe the technical solutions in the embodiments of the present disclosure more clearly, the following briefly describes the accompanying drawings which are useful for describing the embodiments. Apparently, the accompanying drawings in the following description merely represent some and not all of the embodiments of the present disclosure, and a person of ordinary skill in the art may still derive other accompanying drawings from these accompanying drawings without creative efforts.

DETAILED DESCRIPTION

Figure 1:
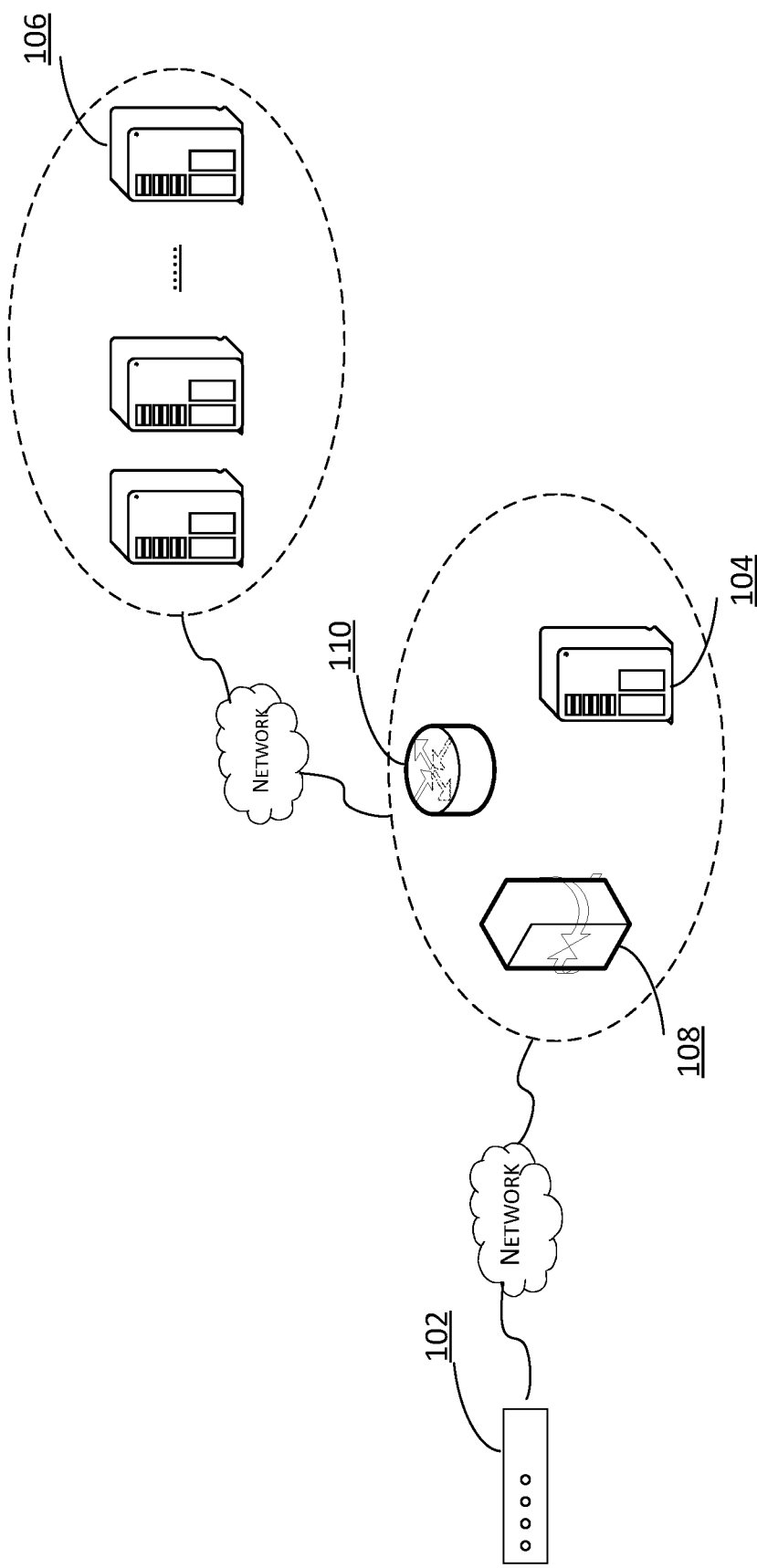
FIG. 1 is a schematic diagram of a data transmission system according to Embodiment 1 of the present disclosure.

In order for those skilled in the art better understand the solutions of the present disclosure, the technical solutions in the embodiments of the present disclosure will be described clearly and completely hereinafter in conjunction with the drawings in the embodiments of the present disclosure. Apparently, the described embodiments merely represent a part of the embodiments of the present disclosure, rather than all embodiments. Other embodiments obtained by a person of ordinary skill in the art based on the embodiments of the present disclosure without creative efforts all fall within the protection scope of the present disclosure.

It should be noted that the terms such as "first" and "second" in the description and claims of the present disclosure as well as the foregoing accompanying drawings are intended to distinguish similar objects and not to describe a specific sequence or a precedence order. It should be understood that the data used in this way can be interchanged under appropriate circumstances, so that the embodiments of the present disclosure described here can be implemented in an order other than those illustrated or described herein. Further, the terms "comprise" and "include", and any variations thereof are intended to cover non-exclusive inclusion. For example, a process, method, system, product or device that comprises a series of acts or units is not necessarily limited to the clearly listed acts or units and may include other acts or units that are not clearly listed or are inherent to the process, method, product, or device.

First of all, some nouns or terms appearing in the process of describing the embodiments of the present disclosure are applicable to the following explanations:

IDC: Internet Data Center.

Public cloud: A cloud computing service provided by a third party and shared by a plurality of clients, generally used via the Internet.

Private cloud: A cloud computing service owned by an enterprise, serving the enterprise only and running in the user's data center.

Hybrid cloud: A hybrid of public cloud and private cloud on both of which the resources of the enterprise are distributed at the same time and which are connected through the Internet.

Enterprise private network: An IT service used for connecting the resources of an enterprise distributed at different locations and serving the enterprise only, which is implemented using VPN technologies, such as MPLS VPN in general and has dedicated physical lines.

Enterprise virtual private network: An IT service used for connecting the resources of an enterprise distributed at different locations and serving the enterprise only, but not having dedicated physical lines, completely multiplexing the corporate Internet line and generally implemented using IPsec VPN technology or Security Socket Layer (SSL) VPN technology.

SDN: Software-defined networking.

SD-WAN: Software-defined wide area network, designed to help users reduce dedicated line expenses and improve network connection flexibility.

User side: In the hybrid cloud architecture, including IT facilities and devices belonging to the enterprise.

AGW: Access gateway, an abstraction of server clusters deployed in the basic network of Alibaba Cloud.

Vxlan: Virtual Extensible LAN, which may be a network virtualization technology and improve the issue of extension during deployment of large-scale cloud computing, and is an extension of vlan.

4G LTE: It is a collective name of LTE network systems such as Time Division Long Term Evolution (TD-LTE) and Frequency Division Duplex Long Term Evolution (FDD-LTE). A 4G network particularly refers to a TD-LTE system network in general.

Embodiment 1

Among the existing technologies for accessing private cloud and hybrid cloud, a solution based on IPsec VPN has the problem of poor quality, while a solution based on dedicated line access has the problems of high cost, a long construction period and requirements for the property.

In order to solve the foregoing technical problems, the present disclosure proposes a data transmission system. FIG. 1 is a schematic diagram of a data transmission system according to Embodiment 1 of the present disclosure. As shown in FIG. 1, the data transmission system may comprise: a transmission terminal 102, a network controller 104 and a backbone transmission network device 106.

Here, the transmission terminal 102 is used for encrypting and encapsulating a data flow to obtain a target data packet; the network controller 104 is deployed in a first Internet network, and stores routing information from the transmission terminal to a receiving terminal; the backbone transmission network device 106 is deployed in a backbone transmission network and used for obtaining the target data packet forwarded by the first Internet network and forwarding the target data packet to the receiving terminal based on the routing information.

For example, the foregoing transmission terminal may be a client terminal (physical machine). For example, it may be a computer terminal or mobile terminal on the user side and located in a client intranet, for example, it may be a PC, a notebook, a smart phone (including an Android mobile phone or an IOS mobile phone), an IPAD, a tablet PC or a palm computer, and is not limited in the present disclosure; the foregoing network controller may be a control server (i.e., controller server) arranged in the first Internet network and may be implemented by deploying control software on a server configured through any hardware; the foregoing first Internet network may be an operator network, for example, a network of T-mobile or AT&T without limitation. In order to consider redundancy and speed up access, a set of network controllers may be deployed in each of different operator networks; the foregoing backbone transmission network device may be arranged in a server or a device in the backbone transmission network, belongs to an enterprise private network and is used for carrying network data of corresponding production services of the client; the foregoing receiving terminal may be a virtual machine of the client's own Virtual Private Cloud (VPC), and may also be another client terminal (physical machine). For example, it may be a PC, a notebook, a smart phone (including an Android mobile phone or an IOS mobile phone), an IPAD, a tablet PC or a palm computer, and is not limited in the present disclosure. That is to say, in the present disclosure, the transmission terminal and the receiving terminal both may be client terminals (physical machines). Further, the receiving terminal may also be a virtual machine. In an example embodiment, when the transmission terminal and the receiving terminal are both physical machines, transmission and receiving are only for differentiating the starting point and end point of data transmission, the starting point of data transmission is a transmission terminal, and the end point of data transmission is a receiving terminal, but it does not mean that the transmission terminal and the receiving terminal have any difference in hardware or software configuration. In fact, the same physical machine may serve as a transmission terminal and may also serve as a receiving terminal.

For example, the network controller may obtain the network segment and routing intent of each client terminal through Border Gateway Protocol (BGP) or static routing (for example, which client terminals, VPCs and cloud resources need to communicate with each other, and which client terminals need to be interconnected) and Quality of Service (QoS) and other parameter configurations can be formulated by users according to actual strategies. The network controller may directly calculate routing information from the transmission terminal to the receiving terminal according to user's intention, including the address of each node that is passed through in the data transmission process from the transmission terminal to the receiving terminal. In an embodiment, centralized acquisition of routing information of each client terminal can be achieved by designing a routing controller in the network controller.

It should also be noted that a client terminal may encrypt and encapsulate a client's data flow to a Vxlan data packet, i.e., the foregoing target data packet. The backbone transmission network may be achieved through isolation of Virtual Routing Forwarding (VRF) similar to MPLS VPN.

In an alternative solution, a controller server may be arranged in an operator network. The client terminal may encrypt an obtained data flow and encapsulate the data flow to a Vxlan data packet and transmit the Vxlan data packet to a backbone transmission network via the operator network. The backbone transmission network device may forward a client's data packet to the destination according to routing information from the transmission terminal to the receiving terminal stored in the controller server.

In the solution provided by the foregoing Embodiment 1 of the present disclosure, a network controller may be deployed in a first Internet network, the network controller stores routing information from a transmission terminal to a receiving terminal, a data flow may be encrypted and encapsulated through the transmission terminal to obtain a target data packet, the target data packet is forwarded to a backbone transmission network through a first Internet network, and further, and the backbone transmission network device may forward the target data packet to a receiving terminal based on the routing information, thereby achieving the purpose of an end-to-end enterprise virtual network.

It is easy to notice that compared to the conventional techniques, encrypting and encapsulating a data flow through a transmission terminal and performing data forwarding through routing information provided by a network controller may achieve automatic learning and automatic forwarding of routing; the client private network is configured automatically and does not need manual configuration; the complexity of routing configuration and maintenance is reduced significantly; no specific persons are needed for operation and maintenance; the quality is high; and the technical effect of improving network quality, raising transmission efficiency and reducing network cost is achieved.

Therefore, the solution of the foregoing Embodiment 1 provided by the present disclosure solves the technical problem of the low efficiency and high cost of the data transmission process in the conventional techniques.

In the foregoing embodiment of the present disclosure, as shown in FIG. 1, the data transmission system may further comprise: a first access gateway 108.

Here, the first access gateway 108 is deployed in the first Internet network and used for receiving the target data packet transmitted by the transmission terminal.

For example, the foregoing first access gateway may be an Access Gateway (AGW) server, and a plurality of AGW servers may be deployed in an operator network to perform data communication with the client terminal as a bridging node for converting the client data packet from the Internet to a backbone transmission network.

For example, the transmission terminal and the first access gateway are connected in any of the following ways: asymmetric digital subscriber line, Internet broadband, wireless network and 4G network. For example, the Internet part may be implemented using the existing Internet connection channels of the client terminal, such as Asymmetric Digital Subscriber Line (ADSL), Internet broadband, wireless network (WiFi), or may be implemented using a built-in 4G LTE network card of the client terminal In an alternative solution, the client terminal may transmit a Vxlan data packet to an AGW server through an encrypted User Datagram Protocol (UDP) message. After the client data packet enters the AGW server, it will be forwarded to a backbone transmission network device.

In the foregoing embodiment of the present disclosure, a network address of a first access gateway is stored in a network controller, and the network controller is further used for transmitting the network address of the first access gateway to the transmission terminal; and the transmission terminal transmits the target data packet to the first access gateway according to the network address of the first access gateway.

In an alternative solution, the controller server may manage all AGW servers in the same operator network, and transmit the IP addresses of all AGW servers to the client terminal, for example, transmit an IP list to the client terminal, so that the terminal may transmit encrypted UDP messages to one of the AGW servers.

In the foregoing embodiment of the present disclosure, at least two first access gateways are deployed in the first Internet network and the transmission terminal transmits a test data packet to each first access gateway respectively to determine the time lag from the transmission terminal to each first access gateway; and the transmission terminal transmits the target data packet to the first access gateway with the least time lag.

In an alternative solution, after the client terminal receives the IP addresses of all AGW servers transmitted by the controller server, the AGW server with the least time lag may be determined, and encrypted UDP messages are transmitted to the AGW server through the IP address of the AGW server.

In the foregoing embodiment of the present disclosure, as shown in FIG. 1, the data transmission system may further comprise: a first edge router 110.

Here, the first edge router 110 is deployed in the first Internet network and used for receiving a target data packet forwarded by a first access gateway and forwarding the target data packet to a backbone transmission network device.

For example, the foregoing first edge router may be a Provider Edge (PE) router and may be deployed on the edge of an operator network and perform data communication with a backbone transmission network device. For example, PE routers may be deployed in different operator networks.

In an alternative solution, after receiving the client data packet transmitted by the transmission terminal, the AGW server may encapsulate a private data packet message tag and client-dedicated routing information through a PE router and forward them to a backbone transmission network device. Here, the client-dedicated routing information may be routing information stored in a controller server and used for implementing transmission of the data packet.

For example, the cross-operator network access may be forwarded from a first edge router of a first Internet network to a backbone transmission network device, and then be forwarded by the backbone transmission network device to a second edge router in a second network such as a second Internet network, so that direct communication between the first edge router in the first Internet network and the second edge router in the second Internet network can be avoided to bypass the operator interworking interface positions where congestion likely happens and to raise access efficiency.

In the foregoing embodiment of the present disclosure, the network controller is further used for transmitting routing information to a first access gateway, and the first access gateway forwards a target data packet and the routing information to a first edge router according to the routing information; and the first edge router forwards the target data packet and the routing information to a backbone transmission network device according to the routing information.

In an alternative solution, an AGW server may obtain the routing information transmitted by the controller server, so that the AGW server may, according to the routing information, forward a client data packet to a PE router, and likewise, the PE router may also obtain the routing information transmitted by the controller server, so that a private data packet message tag and client-dedicated routing information may be encapsulated through the PE router and forwarded to a backbone transmission network device. Here, the client-dedicated routing information may be routing information stored in a controller server and used for implementing transmission of the data packet.

Figure 2:
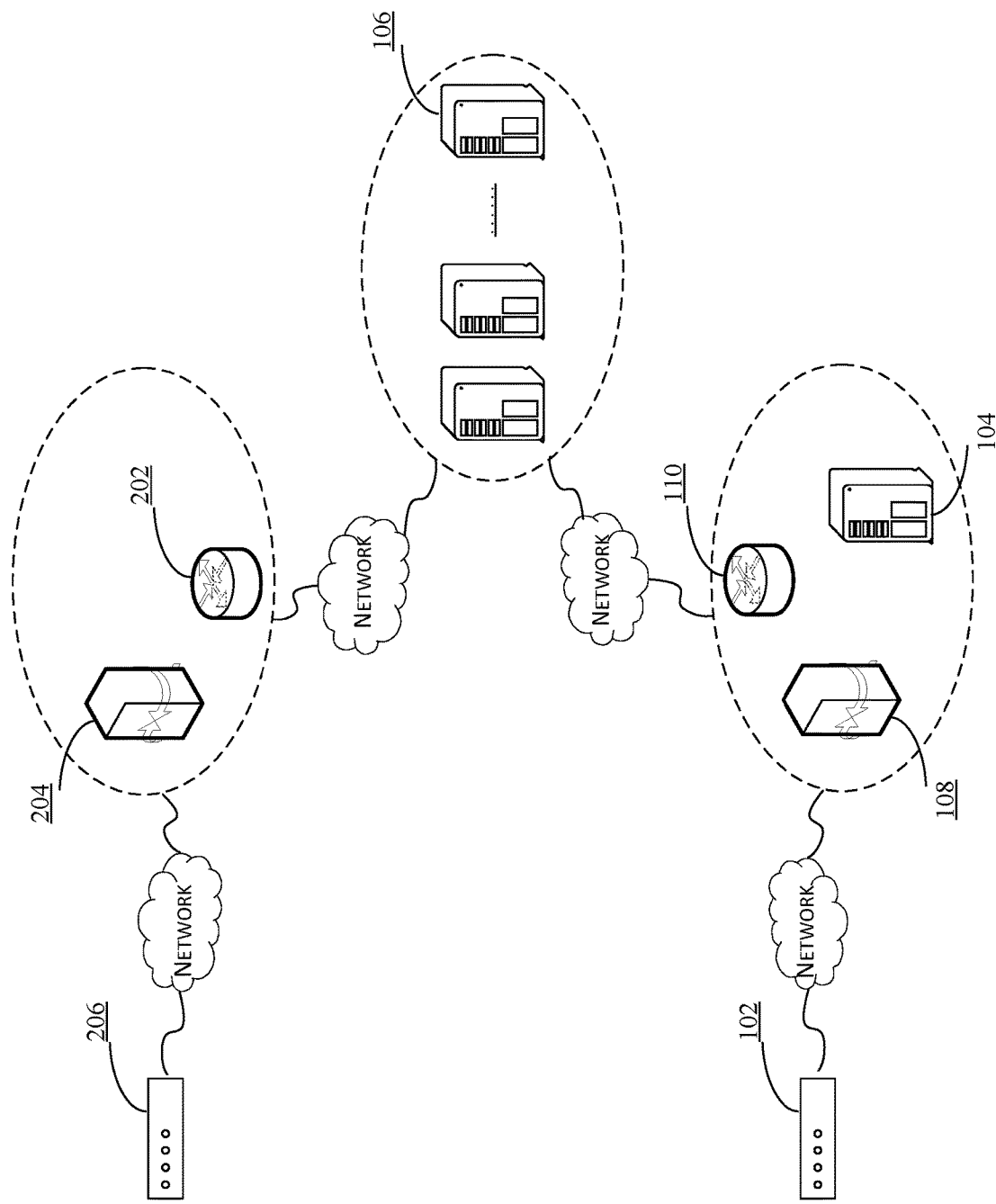
FIG. 2 is a schematic diagram of another data transmission system according to Embodiment 1 of the present disclosure.

In the foregoing embodiment of the present disclosure, as shown in FIG. 2, the receiving terminal is a physical machine, and the data transmission system may further comprise: a second edge router 202, a second access gateway 204 and a receiving terminal 206.

Here, the second edge router 202 is deployed in the second Internet network and used for receiving a target data packet forwarded by a backbone transmission network device and forwarding the target data packet to the second access gateway; the second access gateway 204 is deployed in a second Internet network and used for forwarding the target data packet to the receiving terminal; and the receiving terminal 206 is used for decrypting and decapsulating the target data packet to obtain a data flow.

For example, the foregoing second Internet network may be an operator network different from the first Internet network. For example, the first Internet network may be a T-mobile network, the second Internet network may be a AT&T network, the foregoing second edge router may be a PE router deployed on the edge of the second Internet network, the foregoing second access gateway may be an AGW server deployed in the second Internet network, the receiving terminal may be another client terminal different from the transmission terminal, e.g., a computer terminal or mobile terminal on the user side, and located in a client intranet, for example, it may be a PC, a notebook, a smart phone (including an Android mobile phone or an IOS mobile phone), an IPAD, a tablet PC or a palm computer, and is not limited in the present disclosure.

In an alternative solution, after determining that the received client data packet needs to be forwarded to another client terminal, the backbone transmission network device may forward the client data packet to a PE router on the edge of another operator network, so that the client data packet may be forwarded to another client terminal through an AGW server in the operator network.

Figure 3:
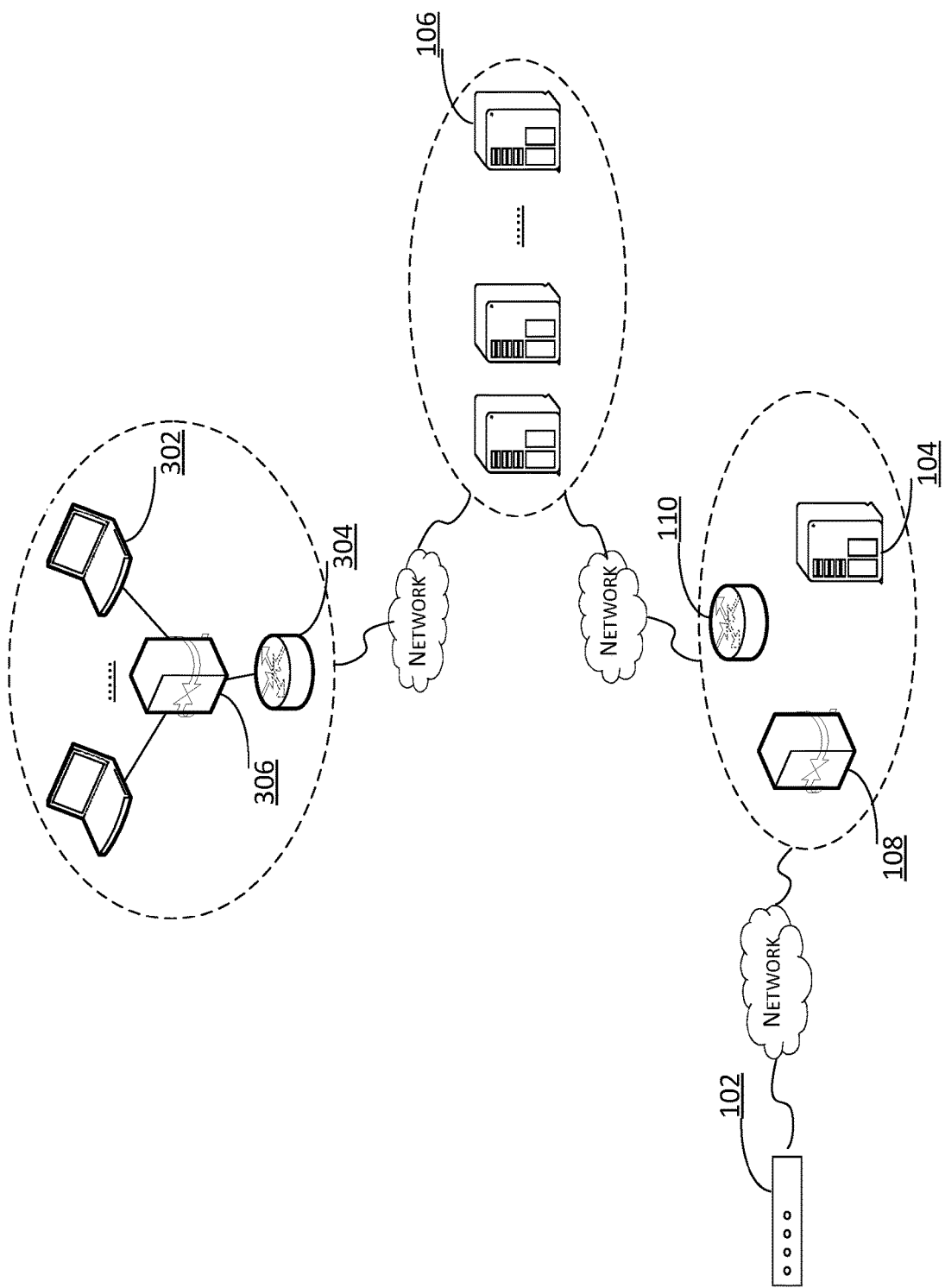
FIG. 3 is a schematic diagram of still another data transmission system according to Embodiment 1 of the present disclosure.

In the foregoing embodiment of the present disclosure, as shown in FIG. 3, the receiving terminal is a virtual machine 302 deployed in a private cloud network, and a virtual router 304 is further deployed in the private cloud network.

Here, the virtual router 304 is used for receiving a target data packet forwarded by a backbone transmission network device and forwarding the target data packet to a virtual machine.

For example, the foregoing private cloud network may be the client's virtual private cloud (VPC), and the foregoing virtual machine may be ECS in the VPC. The foregoing virtual router may be a router in the VPC, or a gateway device connecting the VPC and other networks and may implement forwarding of a data packet through a stored routing table. The VPC may be implemented by a software-defined network (SDN) technology, thereby implementing configuration management of IP addresses, subnets, routing tables and other functions and the management of networks and costs.

In an alternative solution, after determining that a received client data packet needs to be forwarded to a virtual machine deployed in a private cloud network, a backbone transmission network device may forward the client data packet to the private cloud network directly, so that the client data packet may be forwarded to the virtual machine through a router in the private cloud network.

In the foregoing embodiment of the present disclosure, as shown in FIG. 3, a virtual switch 306 is further deployed in the private cloud network.

Here, the virtual switch 306 is used for receiving a target data packet forwarded by a virtual router and forwarding the target data packet to a virtual machine.

For example, one virtual router and a plurality of virtual switches may be deployed in a VPC, and each virtual switch may be connected to a plurality of virtual machines to achieve data packet forwarding among the plurality of virtual machines and the virtual router.

Figure 4:
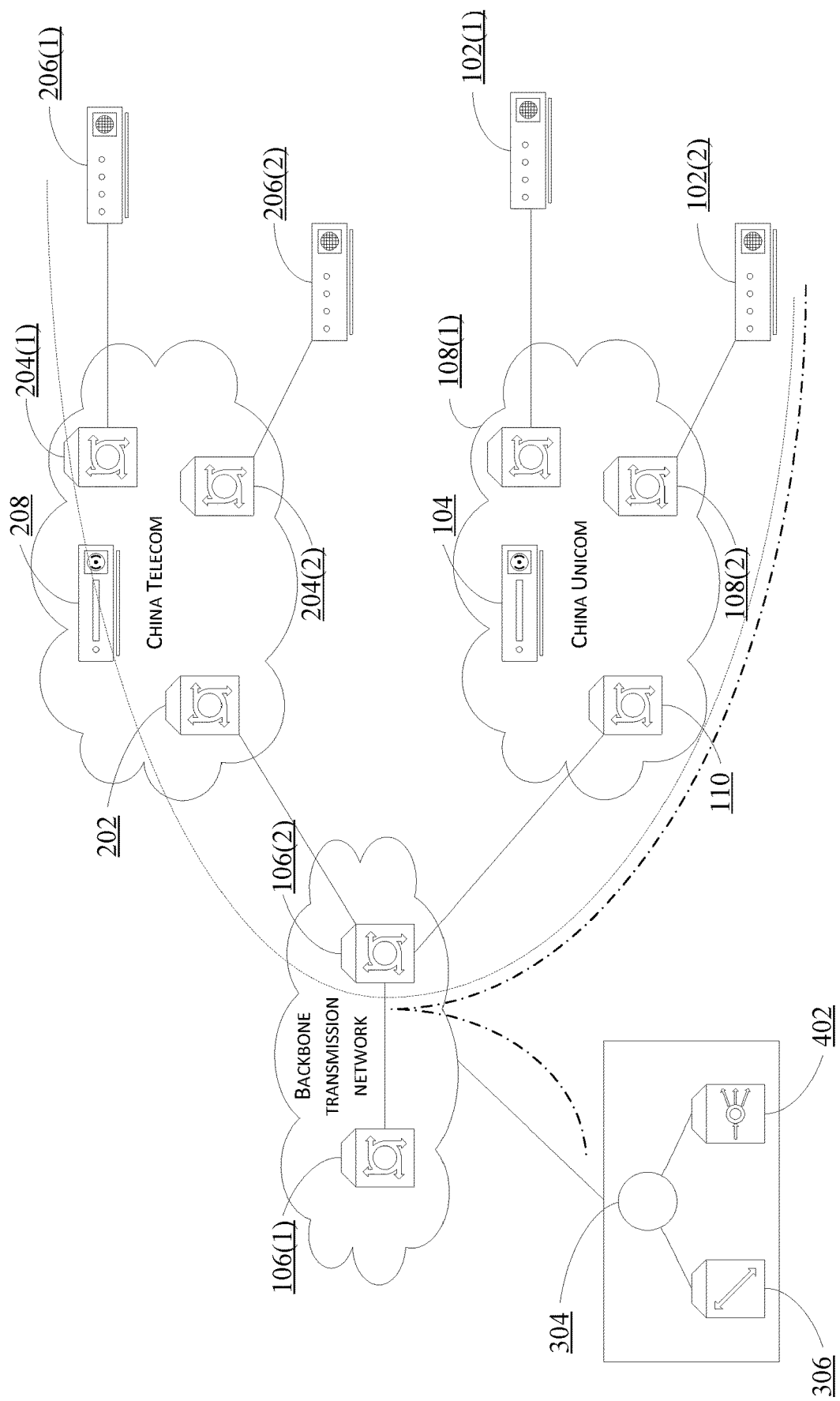
FIG. 4 is a schematic diagram of an alternative data transmission system according to an embodiment of the present disclosure.
Figure 5:
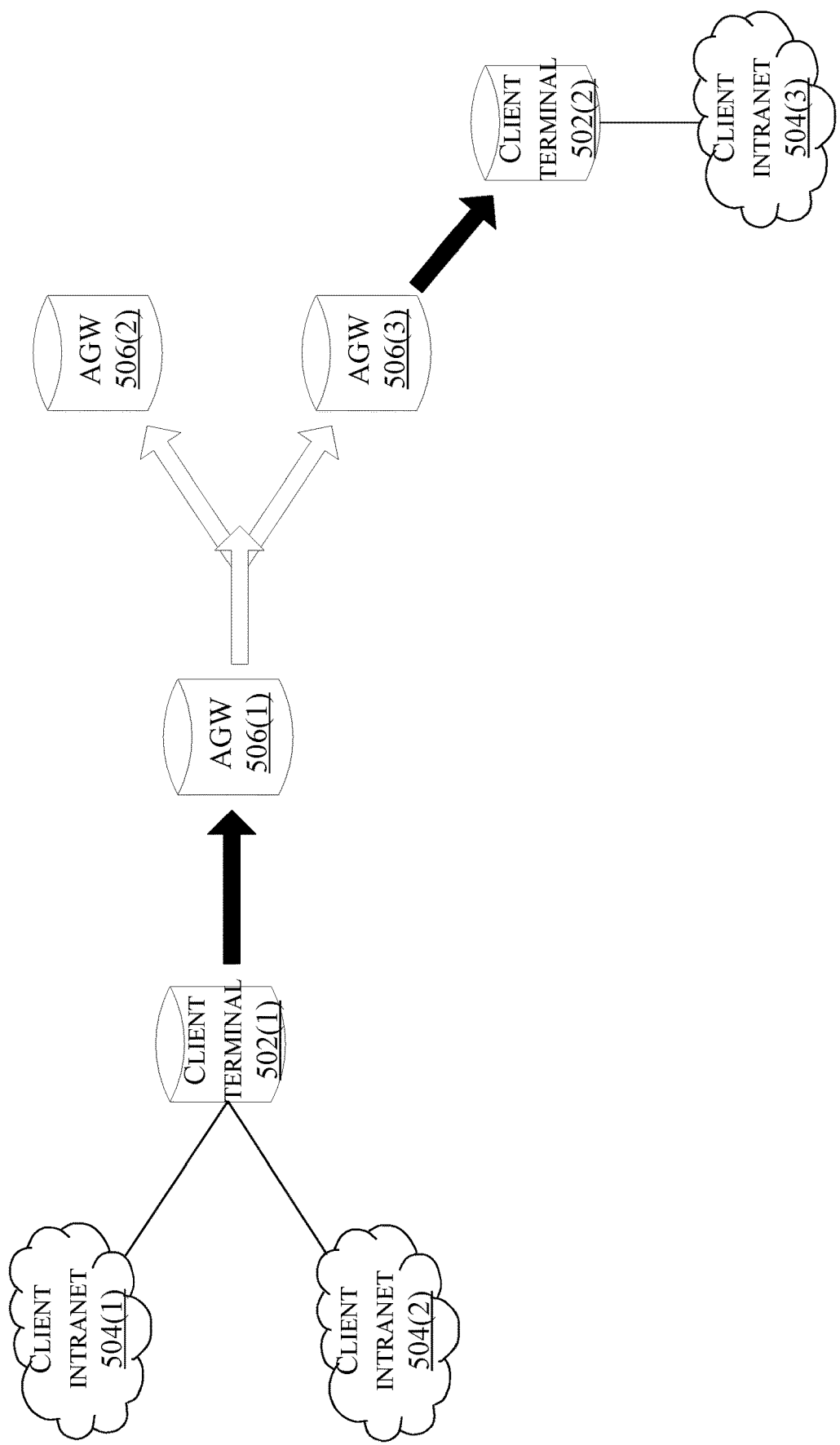
FIG. 5 is a schematic diagram of a flow model of an alternative data transmission system according to an embodiment of the present disclosure.

FIG. 4 is a schematic diagram of an alternative data transmission system according to an embodiment of the present disclosure, and FIG. 5 is a schematic diagram of a flow model of an alternative data transmission system according to an embodiment of the present disclosure. Below, an embodiment of the present disclosure will be described in detail with reference to FIG. 4 and FIG. 5 by taking cross-operator transmission of a data packet as an example.

As shown in FIG. 4, controller servers may be deployed in every operator network (e.g., 208 and 104 in FIG. 4). For example, a group of controller servers are deployed in each of the T-mobile Network and the AT&T network, AGW servers are deployed in operator networks (e.g., 108(1), 108(2), 204(1), and 204(2) in FIG. 4), PE routers are deployed on the edges of operator networks (e.g., 202 and 110 of FIG. 4), and a backbone transmission network device 106 is deployed in a backbone transmission network. The VPC comprises a router 304, a switch 306 connected to the router 304 and a Server Load Balance (SLB) 402 connected to the router 304. Different operator networks are connected to the backbone transmission network, client terminals (e.g., 102(1), 102(2), 206(1), and 206(2) in FIG. 4) are connected to the AGW server through the Internet, and the VPC is connected to the backbone transmission network through an SDN-virtual network. The data packet flow path of a cross-operator network is shown by the dotted line in FIG. 4, and the data packet flow path for access to a VPC through the operator network is shown by the chain line in FIG. 4. For example, a cross-operator network may be a network from the T-mobile network to the AT&T network and the corresponding data packet flow model is as shown in FIG. 5, in which the solid arrow represents the Internet and the hollow arrow represents the backbone transmission network. The client terminal 502(1) is connected to the client intranet 504(1) and 504(2). The data is transmitted from the client terminal 502(1) to the AGW 506(1). AGW 506(1) is connected to AGW 506(2) and AGW 506(3). The client terminal 502(2) is connected to the AGW 506(3) and client intranet 504(3).

A user may encrypt and encapsulate a data flow to a Vxlan data packet through a client terminal, and transmit the data flow through an encrypted UDP message to an AGW server with the least lag from this client terminal. This path passes through the Internet, and the IP address of the AGW server is managed by a controller server and delivered to a client terminal.

After the data packet enters the AGW server, a private data packet message tag and client-dedicated routing information may be encapsulated and forwarded into a backbone transmission network through a PE router on the edge of the T-mobile network.

In the end, the data packet may be forwarded to the destination in the backbone transmission network according to the routing information of the controller server, for example, forwarded to a PE router on the edge of the AT&T network, and forwarded to another client terminal through an AGW server in the AT&T network.

For example, the data packet may also be forwarded through the backbone transmission network to a virtual machine in a VPC.

Through the foregoing solution, a new private connection between a client terminal and cloud or between a client terminal and another client terminal may be generated on the basis of public cloud by software plus hardware, and a client data packet in Metropolitan Area Network (MAN) avoids congestion with the intra-province network of the same operator and congestion of cross-operator network interface through the Internet, and enters the backbone transmission network through the Internet as soon as possible to improve network quality. At the same time, with the cooperation of the network controller and the client terminal, the routing and management information between network instances is automatically pushed by the controller without manual configuration, which greatly reduces the complexity of routing configuration and maintenance, and does not need specific personnel for operation and maintenance. Relative to an IPsec VPN solution, the foregoing solution has the features of no configuration and high quality; relative to a hardware manufacturer, it possesses hardware and software at the same time and makes use of the resource of the backbone transmission network to accelerate the network; and relative to an on-demand network of AT&T, it is free from the restriction of operator barriers and the network data may be encrypted.

Embodiment 2

According to an embodiment of the present disclosure, an embodiment of a data transmission method is further provided. It should be noted that the acts shown in the flowchart of the accompanying drawings may be performed in a computer system such as a set of computer-executable instructions, and although a logical sequence is shown in the flowchart, in some cases, the acts shown or described can be performed in a sequence different from that given herein.

Figure 6:
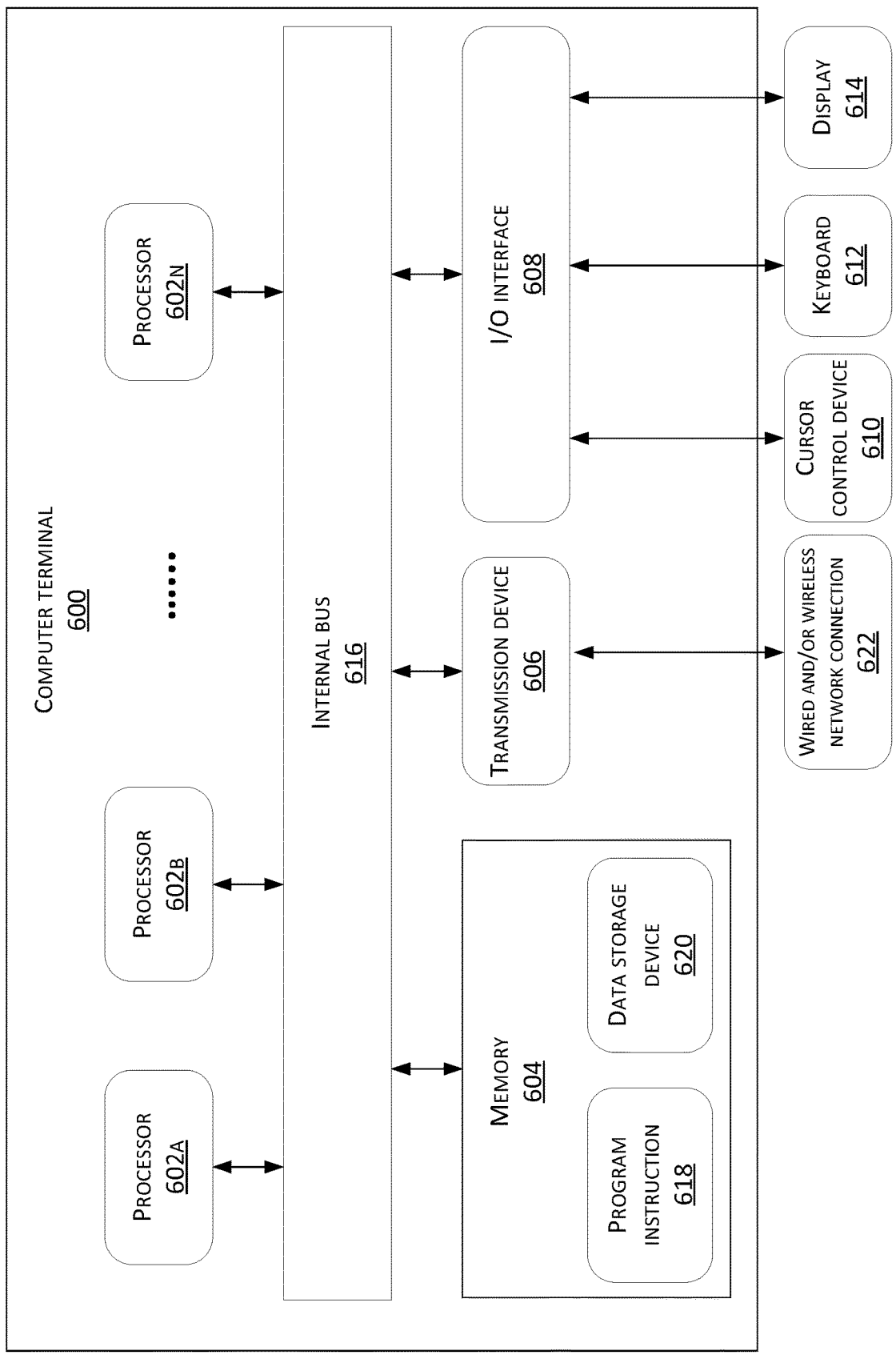
FIG. 6 is a hardware structure block diagram of a computer terminal (or mobile device) for implementing a data transmission method according to an embodiment of the present disclosure.

The method embodiment provided by Embodiment 1 of the present disclosure may be performed in a mobile terminal, a computer terminal or a similar computing device. FIG. 6 is a hardware structure block diagram of a computer terminal (or mobile device) for implementing a data transmission method. As shown in FIG. 6, the computer terminal 600 (such as a mobile device) may comprise one or more (shown as 602a, 602b, . . . , 602n in the figure) processors 602 (the processors 602 may include without limitation microprocessors (MCU) or programmable logic devices (FPGA) and other processing devices), a memory 604 for storing data and a transmission device 606 for a communication function. The computer terminal 600 may further comprise an input/output interface (I/O interface) 608 which may be connected a cursor control device 610, a keyboard 612, a display 614. The computer terminal 600 may also include a universal serial bus (USB) port (it may be included as one of the ports of the I/O interface), a network interface, a power supply and/or a camera (not shown in FIG. 6). Those of ordinary skill may understand that the structure shown in FIG. 6 is schematic only and does not constitute any limitation to the structure of the foregoing electronic device. For example, the computer terminal 600 may further comprise components more than or less than those shown in FIG. 6, or have a configuration different from that shown in FIG. 6. These components may be connected via an internal bus 616.

It should be noted that the foregoing one or more processors 602 and/or other data processing circuits normally may be referred to as "data processing circuits" herein. The data processing circuit may be embodied in whole or in part as software, hardware, firmware or any other combination. Further, a data processing circuit may be a single independent processing module, or fully or partially integrated into any one of the other components in the computer terminal 600 (or mobile device), such as the backbone transmission network device related in an embodiment of the present disclosure and such data processing circuit serves as a processor control (e.g., a choice of the variable resistance terminal path connected to the interface).

The memory 604 may be used for storing software programs and modules of application software, such as program instructions/data storage devices corresponding to the data transmission method in an embodiment of the present disclosure. The processor 602 executes various functional applications and data processing by running the software programs and modules stored in the memory 604, i.e., implements the foregoing data transmission method. The memory 604 stores program instructions 618 and includes data storage device 620. The memory 604 may include a high-speed random memory, and may also include a non-volatile memory, such as one or more magnetic storage devices, flash memories or other non-volatile solid-state memories. For example, the memory 604 may further include memories remotely arranged relative to the processor 602, and these remote memories may be connected to the computer terminal 600 via a network. Examples of the foregoing network include, but are not limited to, the Internet, intranet, LAN, mobile communication network and a combination thereof.

The transmission device 606 is used for receiving or transmitting data via a wired and/or network connection 622. A specific example of the foregoing network may include a wireless network provided by the communication provider of the computer terminal 600. In an example, the transmission device 606 comprises a network adapter (Network Interface Controller, NIC), which may be connected to other network devices through a base station to communicate with the Internet. In an example, the transmission device 606 may be a radio frequency (RF) module, which is used for communicating with the Internet in a wireless manner.

The display 614 may be, for example, a touch screen liquid crystal display (LCD), which allows users to interact with the user interface of a computer terminal 600 (or mobile device).

The hardware structure block diagram shown in FIG. 6 not only may serve as an exemplary block diagram of the foregoing computer terminal 600 (or a mobile device) but also may serve as an exemplary block diagram of the foregoing server. In an alternative embodiment, FIG. 6 shows in the form of a block diagram an embodiment using a computer terminal 600 (or mobile device) shown in the foregoing FIG. 6 as a server. As shown in FIG. 1, the computer terminal 600 (or mobile device) may be a backbone transmission network device 106 and may also be a transmission terminal 102.

It should be noted that the data transmission method provided by an embodiment of the present disclosure may be applied in the data transmission system in Embodiment 1.

Figure 7:
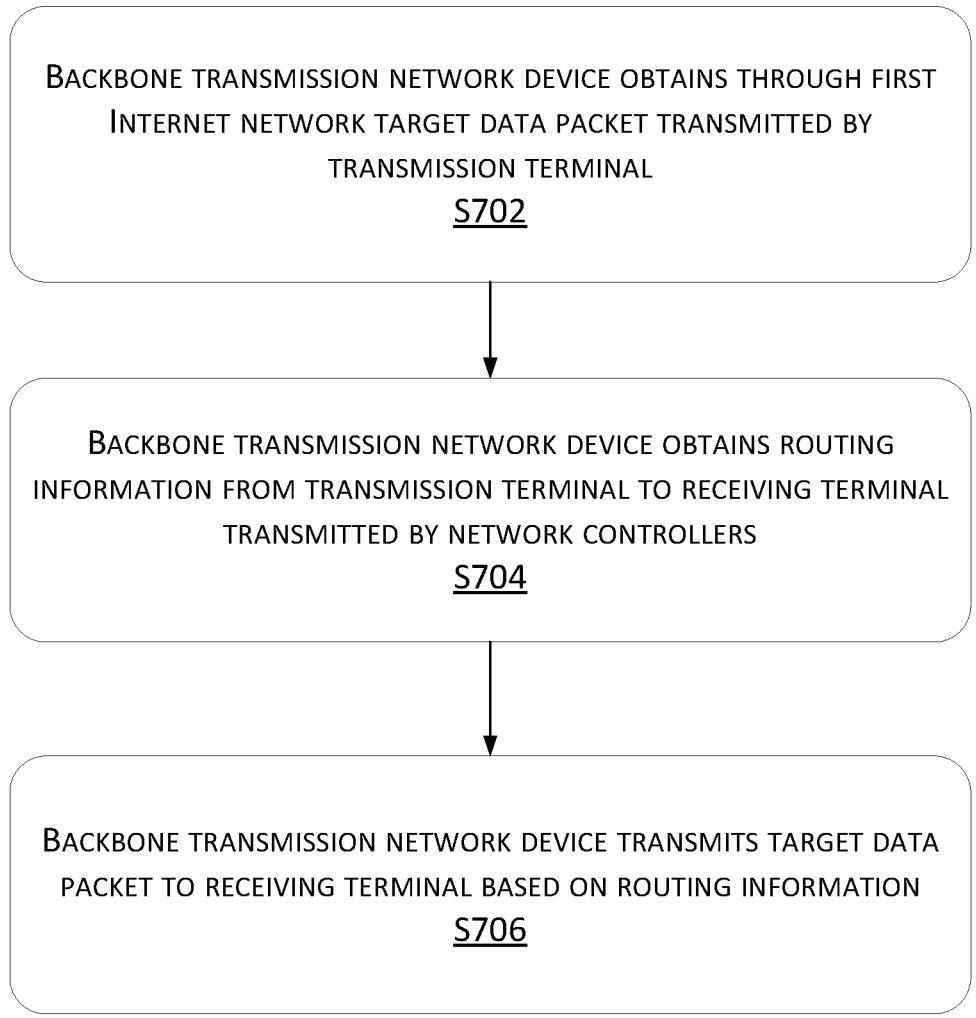
FIG. 7 is a flowchart of a data transmission method according to Embodiment 2 of the present disclosure.

In the foregoing operating environment, the present disclosure provides a data transmission method as shown in FIG. 7. FIG. 7 is a flowchart of a data transmission method according to Embodiment 2 of the present disclosure. As shown in FIG. 7, the method may comprise the following acts:

Step S702, a backbone transmission network device obtains through a first Internet network a target data packet transmitted by a transmission terminal, wherein the target data packet is obtained by the transmission terminal by encrypting and encapsulating a data flow.

For example, the foregoing transmission terminal may be a client terminal, for example it may be a computer terminal or mobile terminal on the user side, and located in a client intranet, for example it may be a PC, a notebook, a smart phone (including an Android mobile phone or an IOS mobile phone), an IPAD, a tablet PC or a palm computer, and is not limited in the present disclosure; the foregoing backbone transmission network device may be a server or a device arranged in the backbone transmission network, belongs to an enterprise private network and is used for carrying network data of corresponding product services of the client.

The network controller may obtain the network segment and routing intent of each client terminal through Border Gateway Protocol (BGP) or static routing (for example, which client terminals, VPCs and cloud resources need to communicate with each other, and which client terminals need to be interconnected) and Quality of Service (QoS) and other parameter configurations can be formulated by users according to actual strategies. A client terminal may encrypt and encapsulate client's data flow to a Vxlan data packet, i.e., the foregoing target data packet.

Step S704, the backbone transmission network device obtains routing information from a transmission terminal to a receiving terminal transmitted by a network controller, wherein the network controller is deployed in the first Internet network.

For example, the foregoing network controller may be arranged in a controller server inside the first Internet network and may be implemented by deploying control software on a server configured through any hardware; the foregoing first Internet network may be an operator network, for example, a network of T-mobile or AT&T. In order to consider redundancy and speed up access, a set of network controllers may be deployed in each of different operator networks; the foregoing receiving terminal may be a virtual machine of the client's own Virtual Private Cloud (VPC) and may also be another client terminal, for example, it may be a PC, a notebook, a smart phone (including an Android mobile phone or an IOS mobile phone), an IPAD, a tablet PC or a palm computer, and is not limited in the present disclosure.

The network controller may directly calculate routing information from the transmission terminal to the receiving terminal according to user's intention, including the address of each node that is passed through in the data transmission process. In an embodiment, centralized acquisition of routing information of each client terminal may be achieved by designing a routing controller in the network controller. The backbone transmission network may be achieved through isolation of Virtual Routing Forwarding (VRF) similar to MPLS VPN.

Step S706, a backbone transmission network device forwards a target data packet to a receiving terminal based on routing information.

In an alternative solution, a controller server may be arranged on the Internet. The transmission terminal may encrypt an obtained data flow and encapsulate the data flow to a Vxlan data packet, and transmits the Vxlan data packet to a backbone transmission network through an operator network. The backbone transmission network device may forward a client's data packet to the destination according to the routing information from the transmission terminal to the receiving terminal stored in the controller server.

In the solution provided by the foregoing Embodiment 2 of the present disclosure, after obtaining a target data packet transmitted by a transmission terminal through a first Internet network, a backbone transmission network device may further obtain routing information from the transmission terminal to a receiving terminal deployed in the first Internet network and transmitted by the network controller, and transmit the target data packet to the receiving terminal based on the routing information, thereby achieving the purpose of an end-to-end enterprise virtual network.

It is easy to notice that compared to the conventional techniques, encrypting and encapsulating a data flow through a transmission terminal and performing data forwarding through routing information provided by a network controller may achieve automatic learning and automatic forwarding of routing; the client private network is configured automatically and does not need manual configuration; the complexity of routing configuration and maintenance is reduced significantly; no specific persons are needed for operation and maintenance; the quality is high; and the technical effect of improving network quality, raising transmission efficiency and reducing network cost is achieved.

Therefore, the solution of the foregoing Embodiment 2 provided by the present disclosure solves the technical problem of the low efficiency and high cost of the data transmission process in the conventional techniques.

In the foregoing embodiment of the present disclosure, step S702, a backbone transmission network device obtains through a first Internet network a target data packet transmitted by a transmission terminal, comprises:

the backbone transmission network device obtains the target data packet forwarded by a first edge router, wherein the target data packet is transmitted by the transmission terminal to a first access gateway, and forwarded by the first access gateway to the first edge router, and wherein the first access gateway and the first edge router are deployed in a first Internet network.

For example, the foregoing first access gateway may be an Access Gateway (AGW) server, and a plurality of AGW servers may be deployed in an operator network to perform data communication with the client terminal as a bridging node for converting the client data packet from the Internet to the backbone transmission network; and the foregoing first edge router may be a Provider Edge (PE) router and may be deployed on the edge of the operator network and perform data communication with a backbone transmission network device. PE routers may be deployed in different operator networks.

For example, the transmission terminal and the first access gateway may be connected in any of the following ways: asymmetric digital subscriber line, Internet broadband, wireless network and 4G network.

For example, the Internet part may be implemented using the existing Internet connection channels of the client terminal, such as Asymmetric Digital Subscriber Line (ADSL), Internet broadband, wireless network (WiFi), or may be implemented using a built-in 4G LTE network card of the client terminal.

In an alternative solution, the client terminal may transmit a Vxlan data packet to an AGW server through an encrypted User Datagram Protocol (UDP) message. After the client data packet enters the AGW server, a private data packet message tag and client-dedicated routing information may be encapsulated through a PE router and forwarded to a backbone transmission network device. Here, the client-dedicated routing information may be routing information stored in a controller server and used for implementing transmission of the data packet.

The cross-operator network access may be forwarded through a PE router to bypass the operator interworking interface positions where congestion likely happens and to raise access efficiency.

In the foregoing embodiment of the present disclosure, the receiving terminal is a physical machine, and step S706, a backbone transmission network device forwards a target data packet to a receiving terminal based on routing information, comprises:

At a first sub-step of S706, the backbone transmission network device forwards the target data packet to a second edge router through a second Internet network based on routing information, wherein the target data packet is forwarded by the second edge router to a second access gateway and forwarded by the second access gateway to a receiving terminal, the target data packet is decrypted and decapsulated by the receiving terminal to obtain a data flow, and the second access gateway and the second edge router are deployed in the second Internet network.

For example, the foregoing second Internet network may be an operator network different from the first Internet network. For example, the first Internet network may be a T-mobile network, the second Internet network may be a AT&T network, the foregoing second edge router may be PE router deployed on the edge of the second Internet network, the foregoing second access gateway may be an AGW server deployed in the second Internet network, the receiving terminal may be another client terminal different from the transmission terminal, may be a computer terminal or mobile terminal on the user side, and located in a client intranet, for example, it may be a PC, a notebook, a smart phone (including an Android mobile phone or an IOS mobile phone), an IPAD, a tablet PC or a palm computer, and is not limited in the present disclosure.

In an alternative solution, after determining that a received client data packet needs to be forwarded to another client terminal, a backbone transmission network device may forward the client data packet to a PE router on the edge of another operator network, so that the client data packet may be forwarded to another client terminal through an AGW server in the operator network.

In the foregoing embodiment of the present disclosure, the receiving terminal is a virtual machine deployed in a private cloud network, and step S706, a backbone transmission network device forwards a target data packet to a receiving terminal based on routing information, comprises:

At a second sub-step of S706, the backbone transmission network device forwards the target data packet to a virtual router through the private cloud network, wherein the target data packet is forwarded by the virtual router to a virtual machine, and the virtual router is deployed in the private cloud network.

For example, the foregoing private cloud network may be the client's virtual private cloud (VPC), and the foregoing virtual machine terminal may be ECS in the VPC. The foregoing virtual router may be a router in the VPC, or a gateway device connecting the VPC and other networks and may implement forwarding of a data packet through a stored routing table. The VPC may be implemented by a software-defined network (SDN) technology, thereby implementing configuration management of IP addresses, subnets, routing tables and other functions and the management of networks and costs.

In an alternative solution, after determining that a received client data packet needs to be forwarded to a virtual machine deployed in a private cloud network, a backbone transmission network device may forward the client data packet to the private cloud network directly, so that the client data packet may be forwarded to the virtual machine receiving the client data packet.

It should be noted that in order to simplify description, the foregoing method embodiments are presented as a series of action combinations, but those skilled in the art should be aware that the present disclosure is not limited by the described action sequence, because according to the present disclosure, some acts may be performed in another sequence or simultaneously. Secondly, those skilled in the art should be aware that the embodiments described in the description are all example embodiments and the involved actions and modules may not be necessary for the present disclosure.

From the description of the foregoing implementations, those skilled in the art may clearly know that the methods according to the foregoing embodiments may be implemented by software plus a necessary universal hardware platform, and of course, may be implemented through hardware, but under many circumstances, the former is a better implementation. Based on this understanding, the technical solution of the present disclosure essentially or the part that contributes to the existing technology may be embodied in the form of a software product, and the computer software product is stored in a storage medium (such as ROM/RAM, disk or CD), including several instructions to make a terminal device (which may be a mobile phone, a computer, a server, a network device, etc.) implement the methods described in the embodiments of the present disclosure.

Embodiment 3

According to an embodiment of the present disclosure, an embodiment of a data transmission method is further provided. It should be noted that the acts shown in the flowchart of the accompanying drawings may be performed in a computer system such as a set of computer-executable instructions, and although a logical sequence is shown in the flowchart, in some cases, the acts shown or described can be performed in a sequence different from that given herein.

It should be noted that the data transmission method provided by an embodiment of the present disclosure may be applied in the data transmission system in Embodiment 1.

Figure 8:
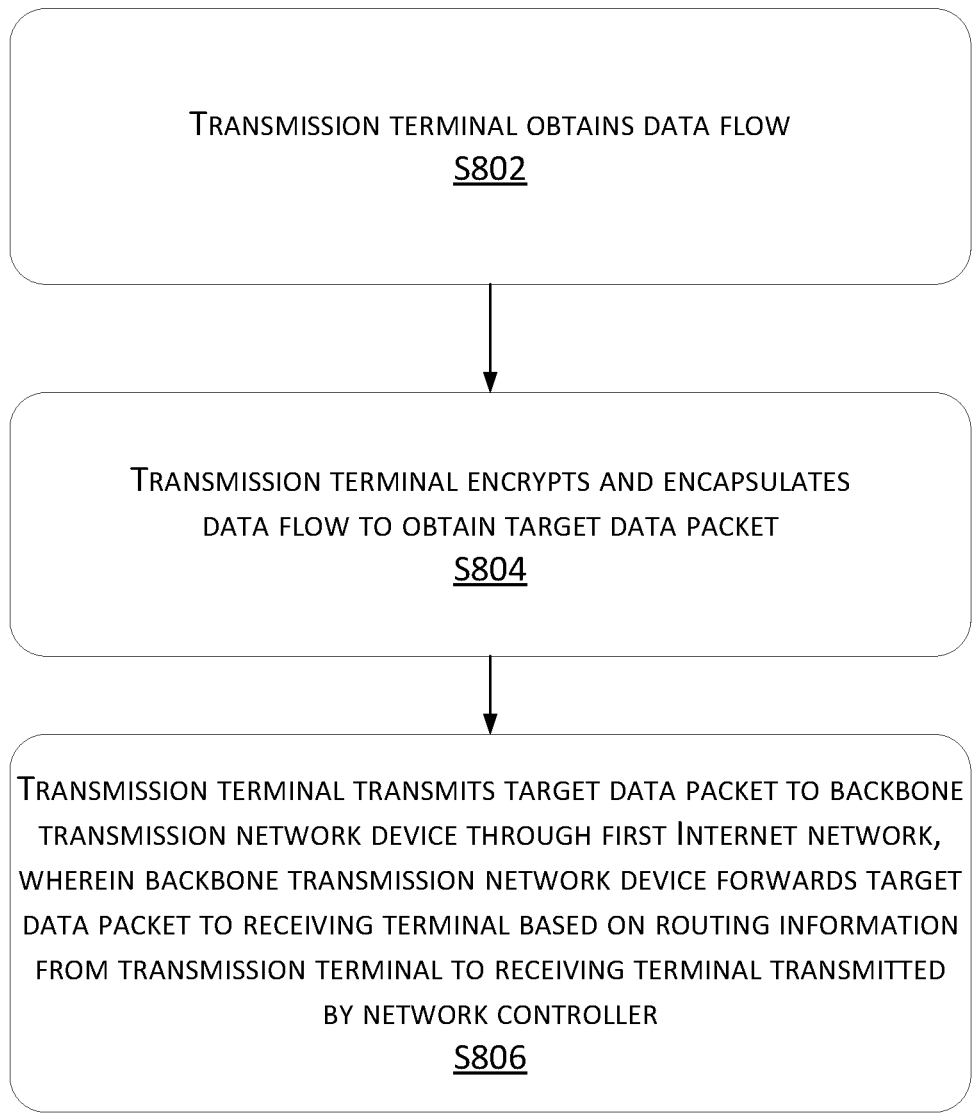
FIG. 8 is a flowchart of a data transmission method according to Embodiment 3 of the present disclosure.

FIG. 8 is a flowchart of a data transmission method according to Embodiment 3 of the present disclosure. As shown in FIG. 8, the method may comprise the following acts:

Step S802, a transmission terminal obtains a data flow.

For example, the foregoing transmission terminal may be a client terminal, for example it may be a computer terminal or mobile terminal on the user side, and located in a client intranet, for example it may be a PC, a notebook, a smart phone (including an Android mobile phone or an IOS mobile phone), an IPAD, a tablet PC or a palm computer, and is not limited in the present disclosure.

Step S804, the transmission terminal encrypts and encapsulates the data flow to obtain a target data packet.

Step S806, the transmission terminal transmits the target data packet to a backbone transmission network device through a first Internet network, wherein the backbone transmission network device forwards the target data packet to a receiving terminal based on routing information from the transmission terminal to the receiving terminal transmitted by a network controller, and the network controller is deployed in the first Internet network.

For example, the foregoing network controller may be arranged in a controller server inside the first Internet network and may be implemented by software; the foregoing first Internet network may be an operator network, for example, a network of T-mobile or AT&T. In order to consider redundancy and speed up access, a set of network controllers may be deployed in each of different operator networks; the foregoing backbone transmission network device may be arranged in a server or a device in the backbone transmission network, belongs to an enterprise private network and is used for carrying network data of corresponding product services of the client; the foregoing receiving terminal may be a virtual machine of the client's own Virtual Private Cloud (VPC), and may also be another client terminal, for example, it may be a PC, a notebook, a smart phone (including an Android mobile phone or an IOS mobile phone), an IPAD, a tablet PC or a palm computer, and is not limited in the present disclosure.

For example, the network controller may obtain the network segment and routing intent of each client terminal through Border Gateway Protocol (BGP) or static routing (for example, which client terminals, VPCs and cloud resources need to communicate with each other, and which client terminals need to be interconnected) and Quality of Service (QoS) and other parameter configurations can be formulated by users according to actual strategies. The network controller may directly calculate routing information from the transmission terminal to the receiving terminal according to user's intention, including the address of each node that is passed through in the data transmission process. In an embodiment, centralized acquisition of routing information of each client terminal can be achieved by designing a routing controller in the network controller.

It should also be noted that a client terminal may encrypt and encapsulate client's data flow to a Vxlan data packet, i.e., the foregoing target data packet. The backbone transmission network may be achieved through isolation of Virtual Routing Forwarding (VRF) similar to MPLS VPN.

In an alternative solution, a controller server may be arranged on the Internet. The client terminal may encrypt an obtained data flow and encapsulate the data flow to a Vxlan data packet and transmit the Vxlan data packet to a backbone transmission network via an operator network. The backbone transmission network device may forward the client's data packet to the destination according to the routing information from the transmission terminal to the receiving terminal stored in the controller server.

In the solution provided by the foregoing Embodiment 3 of the present disclosure, after obtaining a data flow, a transmission terminal may encrypt and encapsulate the data flow to obtain a target data packet, and further transmit the target data packet to a backbone transmission network device through a first Internet network, and the backbone transmission network device forwards the target data packet to a receiving terminal based on routing information from the transmission terminal to the receiving terminal transmitted by a network controller, thereby achieving the purpose of an end-to-end enterprise virtual network.

It is easy to notice that compared to the conventional techniques, encrypting and encapsulating a data flow through a transmission terminal and performing data forwarding through routing information provided by a network controller may achieve automatic learning and automatic forwarding of routing; the client private network is configured automatically and does not need manual configuration; the complexity of routing configuration and maintenance is reduced significantly; no specific persons are needed for operation and maintenance; the quality is high; and the technical effect of improving network quality, raising transmission efficiency and reducing network cost is achieved.

Therefore, the solution of the foregoing Embodiment 3 provided by the present disclosure solves the technical problem of the low efficiency and high cost of the data transmission process in the conventional techniques.

In the foregoing embodiment of the present disclosure, step S806, the transmission terminal transmits the target data packet to a backbone transmission network device through a first Internet network, comprises:

A first sub-step of S806, the transmission terminal transmits the target data packet to a first access gateway, and forwarding the target data packet to a backbone transmission network device through a first edge router, wherein the first access gateway and the first edge router are deployed in a first Internet network.

For example, the foregoing first access gateway may be an Access Gateway (AGW) server, and a plurality of AGW servers may be deployed in an operator network to perform data communication with the client terminal as a bridging node for converting the client data packet from the Internet to the backbone transmission network; and the foregoing first edge router may be a Provider Edge (PE) router and may be deployed on the edge of the operator network and perform data communication with a backbone transmission network device. PE routers may be deployed in different operator networks.

For example, the transmission terminal and the first access gateway may be connected in any of the following ways: asymmetric digital subscriber line, Internet broadband, wireless network and 4G network.

For example, the Internet part may be implemented using the existing Internet connection channels of the client terminal, such as Asymmetric Digital Subscriber Line (ADSL), Internet broadband, wireless network (WiFi), or may be implemented using a built-in 4G LTE network card of the client terminal.

In an alternative solution, a client terminal may transmit a Vxlan data packet to an AGW server through an encrypted User Datagram Protocol (UDP) message. After the client data packet enters the AGW server, a private data packet message tag and client-dedicated routing information may be encapsulated through a PE router and forwarded to a backbone transmission network device. Here, the client-dedicated routing information may be routing information stored in a controller server and used for implementing transmission of the data packet.

For example, cross-operator network access may be forwarded through a PE router to bypass the operator interworking interface positions where congestion likely happens and to raise access efficiency.

In the foregoing embodiment of the present disclosure, at the first sub-step of S806, the transmission terminal transmits the target data packet to a first access gateway, comprises:

the transmission terminal obtains a network address of an access gateway transmitted by a network controller; and the transmission terminal transmits the target data packet to a first access gateway according to the network address of the first access gateway.

In an alternative solution, the controller server may manage all AGW servers in the same operator network, and transmit the IP addresses of all AGW servers to the client terminal, for example, transmit an IP list to the client terminal, so that the terminal may send encrypted UDP messages to one of the AGW servers.

In the foregoing embodiment of the present disclosure, at least two first access gateways are deployed in the first Internet network, and the method further comprises:

Step S88, the transmission terminal transmits a test data packet to each first access gateway respectively to determine the time lag from the transmission terminal to each first access gateway.

Step S810, the transmission terminal transmits the target data packet to the first access gateway with the least time lag.

In an alternative solution, after the client terminal receives the IP addresses of all AGW servers transmitted by the controller server, the AGW server with the least time lag may be determined, and encrypted UDP messages are transmitted to the AGW server through the IP address of the AGW server.

Embodiment 4

Figure 9:
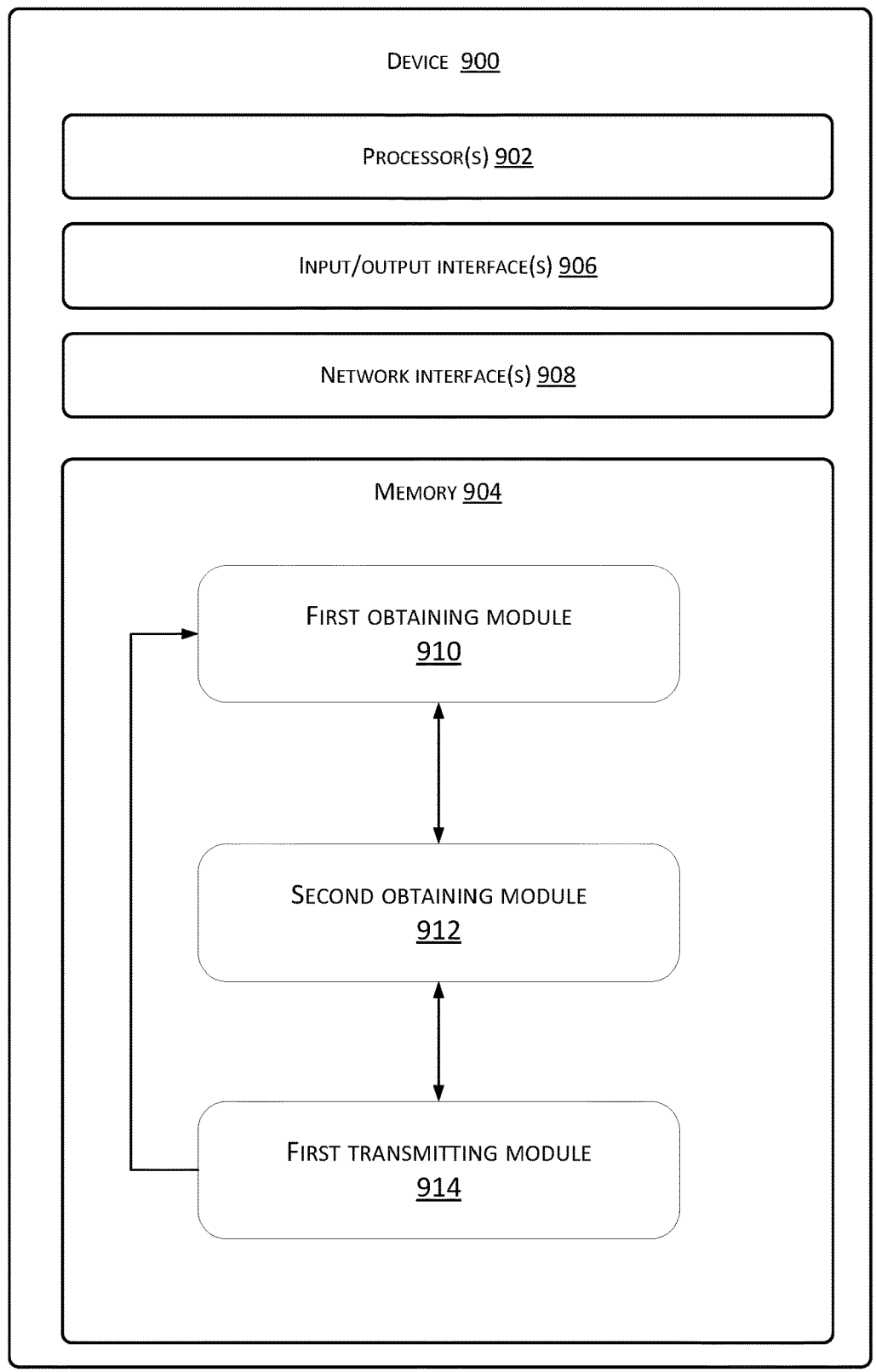
FIG. 9 is a schematic diagram of a data transmission device according to Embodiment 4 of the present disclosure.

According to an embodiment of the present disclosure, a data transmission device for implementing the foregoing data transmission method is further provided. As shown in FIG. 9, the device 900 includes one or more processor(s) 902 or data processing unit(s) and memory 904. The device 900 may further include one or more input/output interface(s) 906 and one or more network interface(s) 908.

The memory 904 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media or transitory media such as a modulated data signal and carrier.

The memory 904 may store therein a plurality of modules or units including a first obtaining module 910, a second obtaining module 912 and a first transmitting module 914.

Here, the first obtaining module 910 is used for obtaining through a first Internet network a target data packet transmitted by a transmission terminal, wherein the target data packet is obtained by the transmission terminal by encrypting and encapsulating a data flow; the second obtaining module 912 is used for obtaining routing information from the transmission terminal to a receiving terminal transmitted by a network controller, wherein the network controller is deployed in the first Internet network; and the first transmitting module 914 is used for forwarding the target data packet to the receiving terminal based on the routing information For example, the foregoing data transmission device 900 may be a device used for implementing the foregoing data transmission method in a backbone transmission network device; the foregoing transmission terminal may be a client terminal, for example it may be a computer terminal or mobile terminal on the user side, and located in a client intranet, for example it may be a PC, a notebook, a smart phone (including an Android mobile phone or an IOS mobile phone), an IPAD, a tablet PC or a palm computer, and is not limited in the present disclosure; the foregoing backbone transmission network device may be a server or a device arranged in the backbone transmission network, belongs to an enterprise private network and is used for carrying network data of corresponding product services of the client; the foregoing network controller may be arranged in a controller server inside the first Internet network and may be implemented by software; the foregoing first Internet network may be an operator network, for example, a network of T-mobile or AT&T. In order to consider redundancy and speed up access, a set of network controllers may be deployed in each of different operator networks; the foregoing receiving terminal may be a virtual machine of the client's own Virtual Private Cloud (VPC) and may also be another client terminal, for example, it may be a PC, a notebook, a smart phone (including an Android mobile phone or an IOS mobile phone), an IPAD, a tablet PC or a palm computer, and is not limited in the present disclosure.

For example, the foregoing first obtaining module 910, second obtaining module 912 and first transmitting module 914 correspond to step S702 to step S706 in Embodiment 2, and the examples implemented by the three modules and the corresponding acts, and the application scenarios are the same, but are not limited to the content disclosed by the foregoing Embodiment 2. It should be noted that the foregoing modules as a part of the device may be operated in a computer terminal 600 provided in Embodiment 2.

In the solution provided by the foregoing Embodiment 4 of the present disclosure, after a target data packet transmitted by a transmission terminal is obtained through a first Internet network, routing information from the transmission terminal to a receiving terminal deployed in a first Internet network and transmitted by a network controller may be further obtained, and the target data packet is transmitted to the receiving terminal based on the routing information, thereby achieving the purpose of an end-to-end enterprise virtual network.

It is easy to notice that compared to the conventional techniques, encrypting and encapsulating a data flow through a transmission terminal and performing data forwarding through routing information provided by a network controller may achieve automatic learning and automatic forwarding of routing; the client private network is configured automatically and does not need manual configuration; the complexity of routing configuration and maintenance is reduced significantly; no specific persons are needed for operation and maintenance; the quality is high; and the technical effect of improving network quality, raising transmission efficiency and reducing network cost is achieved.

Therefore, the solution of the foregoing Embodiment 4 provided by the present disclosure solves the technical problem of the low efficiency and high cost of the data transmission process in the conventional techniques.

In the foregoing embodiment of the present disclosure, the first obtaining module comprises: an obtaining submodule.

Here, the obtaining submodule is used for obtaining a target data packet forwarded by a first edge router, wherein the target data packet is transmitted by the transmission terminal to a first access gateway, and forwarded by the first access gateway to the first edge router, and wherein the first access gateway and the first edge router are deployed in a first Internet network.

For example, the transmission terminal and the first access gateway may be connected in any of the following ways: asymmetric digital subscriber line, Internet broadband, wireless network and 4G network.

In the foregoing embodiment of the present disclosure, the receiving terminal is a physical machine, and the first transmitting module comprises: a first transmitting submodule.

Here, the first transmitting submodule is used for forwarding the target data packet to a second edge router through a second Internet network based on routing information, wherein the target data packet is forwarded by the second edge router to a second access gateway and forwarded by the second access gateway to a receiving terminal, the target data packet is decrypted and decapsulated by the receiving terminal to obtain a data flow, and the second access gateway and the second edge router are deployed in the second Internet network.

In the foregoing embodiment of the present disclosure, the receiving terminal is a virtual machine deployed in a private cloud network, and the first transmitting module comprises: a second transmitting submodule.

Here, the second transmitting submodule is used for forwarding the target data packet to a virtual router through the private cloud network, wherein the target data packet is forwarded by the virtual router to a virtual machine, and the virtual router is deployed in the private cloud network.

Embodiment 5

Figure 10:
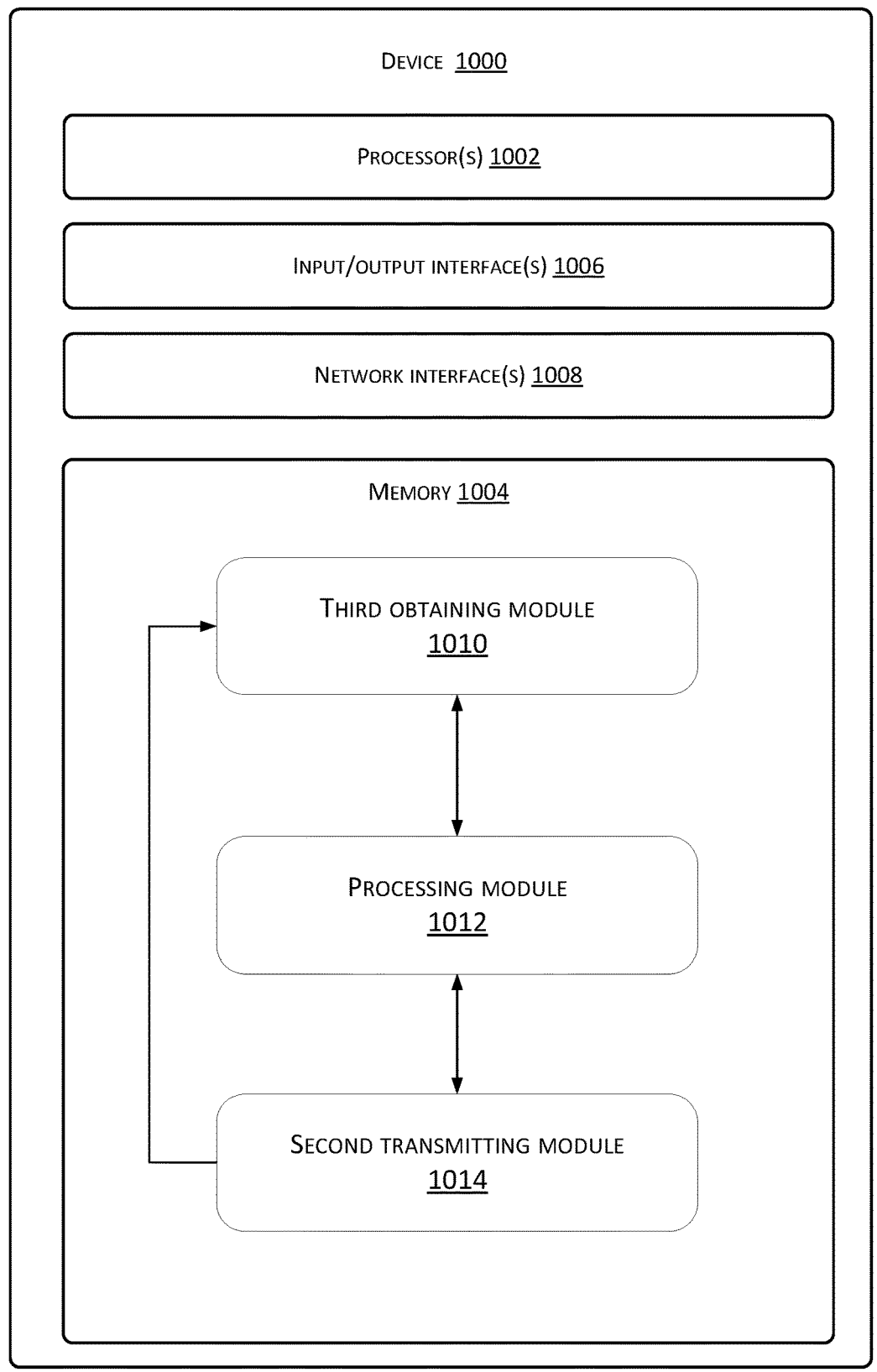
FIG. 10 is a schematic diagram of a data transmission device according to Embodiment 5 of the present disclosure.

According to an embodiment of the present disclosure, a data transmission device for implementing the foregoing data transmission method is further provided. As shown in FIG. 10, the device 1000 includes one or more processor(s) 1002 or data processing unit(s) and memory 1004. The device 1000 may further include one or more input/output interface(s) 1006 and one or more network interface(s) 1008.

The memory 1004 is an example of computer readable media. The memory 1004 may store therein a plurality of modules or units including a third obtaining module 1010, a processing module 1012 and a second transmitting module 1014.

Here, the third obtaining module 1010 is used for obtaining a data flow; the processing module 1012 is used for encrypting and encapsulating the data flow to obtain a target data packet; and the second transmitting module 1014 is used for transmitting the target data packet to a backbone transmission network device through a first Internet network, wherein the backbone transmission network device forwards the target data packet to a receiving terminal based on routing information from the transmission terminal to the receiving terminal transmitted by a network controller, and the network controller is deployed in a first Internet network.

For example, the foregoing data transmission device 1000 may be a device used for implementing the foregoing data transmission method in a transmission terminal; the foregoing transmission terminal may be a client terminal, for example it may be a computer terminal or mobile terminal on the user side, and located in a client intranet, for example it may be a PC, a notebook, a smart phone (including an Android mobile phone or an IOS mobile phone), an IPAD, a tablet PC or a palm computer, and is not limited in the present disclosure; the foregoing network controller may be arranged in a controller server inside the first Internet network and may be implemented by software; the foregoing first Internet network may be an operator network, for example, a network of T-mobile or AT&T. In order to consider redundancy and speed up access, a set of network controllers may be deployed in each of different operator networks; the foregoing receiving terminal may be a virtual machine of the client's own Virtual Private Cloud (VPC) and may also be another client terminal, for example, it may be a PC, a notebook, a smart phone (including an Android mobile phone or an IOS mobile phone), an IPAD, a tablet PC or a palm computer, and is not limited in the present disclosure.

Here, it should be noted that the foregoing third obtaining module 1010, processing module 1012 and second transmitting module 1014 correspond to step S802 to step S806 in Embodiment 3, and the examples implemented by the three modules and the corresponding acts, and the application scenarios are the same, but are not limited to the content disclosed by the foregoing Embodiment 3. It should be noted that the foregoing modules as a part of the device may be operated in a computer terminal 600 provided in Embodiment 2.

In the solution provided by the foregoing Embodiment 5 of the present disclosure, after a data flow is obtained, the data flow may be encrypted and encapsulated to obtain a target data packet, further the target data packet is transmitted to a backbone transmission network device through a first Internet network, and the backbone transmission network device forwards the target data packet to a receiving terminal based on routing information from the transmission terminal to the receiving terminal transmitted by a network controller, thereby achieving the purpose of an end-to-end enterprise virtual network.

It is easy to notice that compared to the conventional techniques, encrypting and encapsulating a data flow through a transmission terminal and performing data forwarding through routing information provided by a network controller may achieve automatic learning and automatic forwarding of routing; the client private network is configured automatically and does not need manual configuration; the complexity of routing configuration and maintenance is reduced significantly; no specific persons are needed for operation and maintenance; the quality is high; and the technical effect of improving network quality, raising transmission efficiency and reducing network cost is achieved.

Therefore, the solution of the foregoing Embodiment 5 provided by the present disclosure solves the technical problem of the low efficiency and high cost of the data transmission process in the conventional techniques.

In the foregoing embodiment of the present disclosure, the second transmitting module comprises: a third transmitting submodule.

Here, the third transmitting submodule is used for transmitting a target data packet to a first access gateway, and forwarding the target data packet to a backbone transmission network device through a first edge router, wherein the first access gateway and the first edge router are deployed in a first Internet network.

In the foregoing embodiment of the present disclosure, the third transmitting submodule comprises: an obtaining unit and a transmitting unit.

Here, the obtaining unit is used for obtaining a network address of an access gateway transmitted by a network controller; and the transmitting unit is used for transmitting the target data packet to a first access gateway according to the network address of the first access gateway.

In the foregoing embodiment of the present disclosure, the second transmitting module is further used for transmitting a test data packet to each first access gateway respectively to determine the time lag from the transmission terminal to each first access gateway, and transmitting the target data packet to the first access gateway with the least time lag.

Embodiment 6

An embodiment of the present disclosure may provide a computer terminal, which may be any computer terminal device in a computer terminal group. For example, in this embodiment, the foregoing computer terminal may be substituted with a mobile terminal or another terminal device.

For example, in this embodiment, the foregoing computer terminal may be located in at least one of a plurality of network devices of a computer network.

In this embodiment, the foregoing computer terminal may execute the program codes of the following acts in the data transmission method: a backbone transmission network device obtains through a first Internet network a target data packet transmitted by a transmission terminal, wherein the target data packet is obtained by the transmission terminal by encrypting and encapsulating a data flow transmitted by the transmission terminal; the backbone transmission network device obtains routing information from the transmission terminal to a receiving terminal transmitted by a network controller, wherein the network controller is deployed in the first Internet network; and the backbone transmission network device forwards the target data packet to the receiving terminal based on the routing information.

Figure 11:
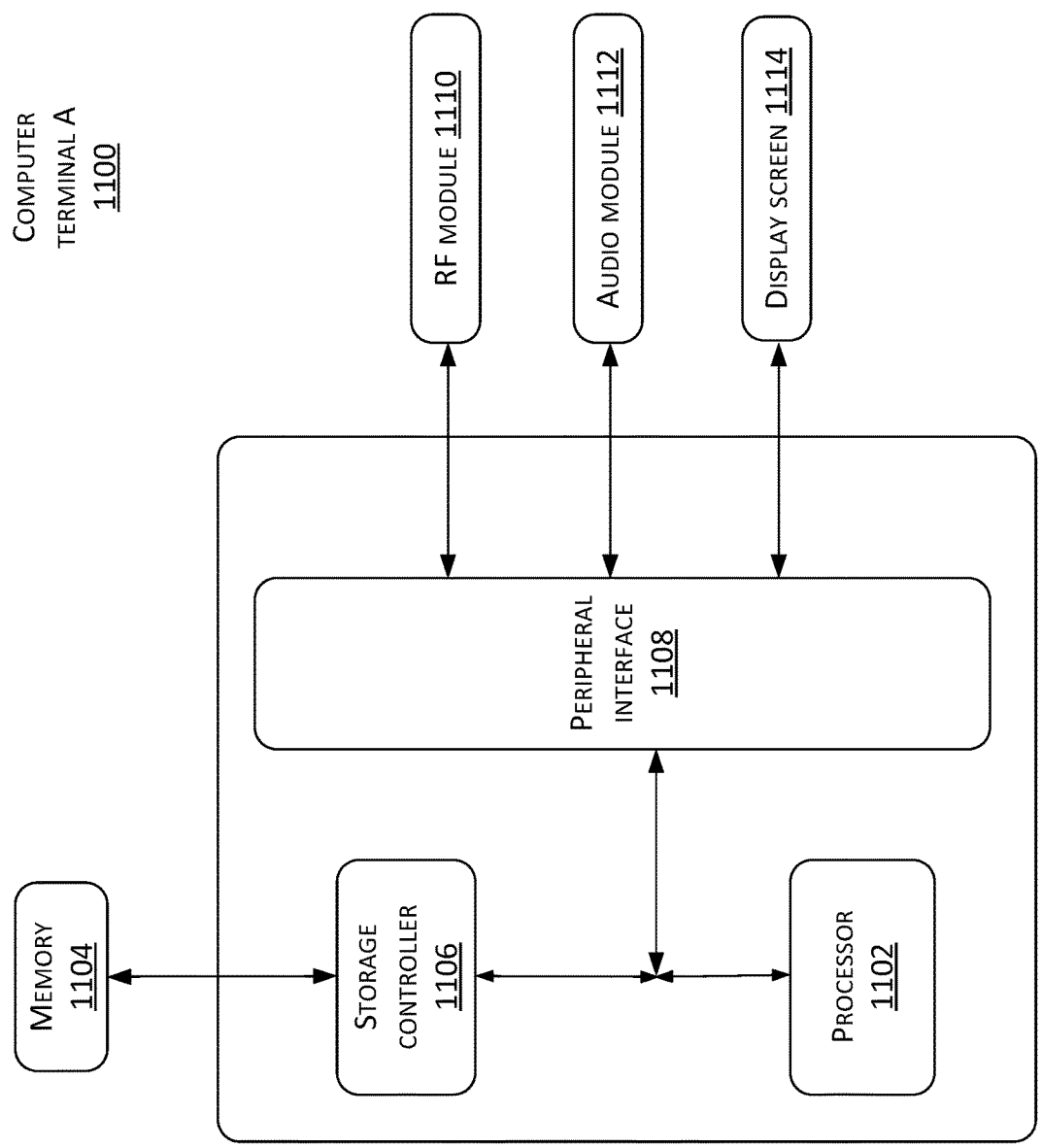
FIG. 11 is a structure block diagram of a computer terminal according to an embodiment of the present disclosure.

For example, FIG. 11 is a structure block diagram of a computer terminal according to an embodiment of the present disclosure. As shown in FIG. 11, the computer terminal A 1100 may comprise: one or more (only one is shown in the figure) processors 1102 and a memory 1104. The processor 1102 communicates with the memory 1104 via the storage controller 1106. The processor 1102 and the storage controller 1106 also communicates with the peripheral interface 1108. The peripheral interface 1108 communicates with the RF module 1110, the audio module 1112, and the display module 1114.

Here, the memory 1104 may be used for storing software programs and modules, such as program instructions/modules corresponding to the data transmission method in an embodiment of the present disclosure. The processor 1102 executes various functional applications and data processing by running the software programs and modules stored in the memory, i.e., implements the foregoing data transmission method. The memory 1104 may include a high-speed random memory, and may also include a non-volatile memory, such as one or more magnetic storage devices, flash memories or other non-volatile solid-state memories. For example, the memory 1104 may further include memories remotely arranged relative to the processor, and these remote memories may be connected to the computer terminal A via a network. Examples of the foregoing network include, but are not limited to, the Internet, intranet, LAN, mobile communication network and a combination thereof.

The processor 1102 may invoke information and applications stored in the memory 1104 through a transmission device to perform the following acts: a backbone transmission network device obtains through a first Internet network a target data packet transmitted by a transmission terminal, wherein the target data packet is obtained by the transmission terminal by encrypting and encapsulating a data flow transmitted by the transmission terminal; the backbone transmission network device obtains routing information from the transmission terminal to a receiving terminal transmitted by a network controller, wherein the network controller is deployed in the first Internet network; and the backbone transmission network device forwards the target data packet to the receiving terminal based on the routing information.

For example, the foregoing processor 1102 may further execute a program code of the following step: a backbone transmission network device obtains a target data packet forwarded by a first edge router, wherein the target data packet is transmitted by the transmission terminal to a first access gateway, and forwarded by the first access gateway to the first edge router, and wherein the first access gateway and the first edge router are deployed in a first Internet network.

For example, the foregoing processor 1102 may further execute a program code of the following step: the transmission terminal and the first access gateway may be connected in any of the following ways: asymmetric digital subscriber line, Internet broadband, wireless network and 4G network.

For example, the foregoing processor 1102 may further execute a program code of the following step: the receiving terminal is a physical machine and the backbone transmission network device forwards the target data packet to a second edge router through a second Internet network based on routing information, wherein the target data packet is forwarded by the second edge router to a second access gateway and forwarded by the second access gateway to a receiving terminal, the target data packet is decrypted and decapsulated by the receiving terminal to obtain a data flow, and the second access gateway and the second edge router are deployed in the second Internet network.

For example, the foregoing processor 1102 may further execute a program code of the following step: the receiving terminal is a virtual machine deployed in a private cloud network, and a backbone transmission network device forwards the target data packet to a virtual router through the private cloud network, wherein the target data packet is forwarded by the virtual router to a virtual machine, and the virtual router is deployed in the private cloud network.

In an embodiment of the present disclosure, after obtaining a target data packet transmitted by a transmission terminal through a first Internet network, a backbone transmission network device may further obtain routing information from the transmission terminal to a receiving terminal deployed in the first Internet network and transmitted by a network controller, and transmit the target data packet to the receiving terminal based on the routing information, thereby achieving the purpose of an end-to-end enterprise virtual network.

Compared to the conventional techniques, encrypting and encapsulating a data flow through a transmission terminal and performing data forwarding through routing information provided by a network controller may achieve automatic learning and automatic forwarding of routing; the client private network is configured automatically and does not need manual configuration; the complexity of routing configuration and maintenance is reduced significantly; no specific persons are needed for operation and maintenance; the quality is high; and the technical effect of improving network quality, raising transmission efficiency and reducing network cost is achieved.

Therefore, the solution of the embodiment provided by the present disclosure solves the technical problem of the low efficiency and high cost of the data transmission process in the conventional techniques.

Those of ordinary skill may understand that the structure shown in FIG. 11 is schematic only, the computer terminal may also be a smart phone (e.g., an Android phone or an iOS phone), a tablet computer, a palm computer, a Mobile Internet Device (MID), a PAD or another terminal device. FIG. 11 does not constitute any limitation to the structure of the foregoing electronic device. For example, the computer terminal A may further comprise components (e.g., network interface and display device) more than or less than those shown in FIG. 11, or have a configuration different from that shown in FIG. 11.

Those of ordinary skill in the art may understand that all or some of the acts in various methods of the foregoing embodiments may be completed by instructing relevant hardware of the terminal device through a program. The program may be stored in a computer-readable storage medium, which may include: Flash disk, Read-Only Memory (ROM), Random Access Memory (RAM), magnetic disk, CD, etc.

Embodiment 7

An embodiment of the present disclosure further provides a storage medium. For example, in this embodiment, the foregoing storage medium may be used for saving the program codes executed by the data transmission method provided by the foregoing Embodiment 1.

For example, in this embodiment, the foregoing storage medium may be located in any computer terminal of a computer terminal group in a computer network, or located in any mobile terminal in a mobile terminal group.

For example, in this embodiment, the storage medium is configured to store program codes for performing the following acts: a backbone transmission network device obtains through a first Internet network a target data packet transmitted by a transmission terminal, wherein the target data packet is obtained by the transmission terminal by encrypting and encapsulating a data flow transmitted by the transmission terminal; the backbone transmission network device obtains routing information from the transmission terminal to a receiving terminal transmitted by a network controller, wherein the network controller is deployed in the first Internet network; and the backbone transmission network device forwards the target data packet to the receiving terminal based on the routing information.

For example, the foregoing storage medium is further configured to store a program code for performing the following step: the backbone transmission network device obtains a target data packet forwarded by a first edge router, wherein the target data packet is transmitted by the transmission terminal to a first access gateway and forwarded by the first access gateway to the first edge router, wherein the first access gateway and the first edge router are deployed in the first Internet network.

For example, the foregoing storage medium is further configured to store a program code for performing the following acts: the transmission terminal and the first access gateway are connected in any of the following ways: asymmetric digital subscriber line, Internet broadband, wireless network and 4G network.

For example, the foregoing storage medium is further configured to store a program code for performing the following step: the receiving terminal is a physical machine and the backbone transmission network device forwards the target data packet to a second edge router through a second Internet network based on the routing information, wherein the target data packet is forwarded by the second edge router to a second access gateway, forwarded by the second access gateway to the receiving terminal and decrypted and decapsulated by the receiving terminal to obtain a data flow, and the second access gateway and the second edge router are deployed in the second Internet network.

For example, the foregoing storage medium is further configured to store a program code for performing the following step: the receiving terminal is a virtual machine deployed in a private cloud network and the backbone transmission network device forwards the target data packet to a virtual router through the private cloud network, wherein the target data packet is forwarded by the virtual router to the virtual machine, and the virtual router is deployed in the private cloud network.

The serial numbers of the foregoing embodiments of the present disclosure are for description only and do not represent the merits of the embodiments.

In the foregoing embodiments of the present disclosure, the description of each embodiment has its own emphasis. Parts that are not detailed in an embodiment may be seen in the relevant descriptions of other embodiments.

In the several embodiments provided by the present disclosure, it should be understood that the disclosed technical content may be implemented in other ways. Here, the device embodiments described above are schematic only, for example, the division of the units is only a division of logical functions and there may be other division methods in actual implementation, for example, a plurality of units or components may be combined or integrated into another system, or some features may be ignored or not implemented. On the other hand, the displayed or discussed mutual coupling or direct coupling or communication connection may be indirect coupling or communication connection through some interfaces, units or modules, and may be in electrical or other forms.

A unit described as a separate component may or may not be physically separate, and a component displayed as a unit may or may not be a physical unit, that is, it may be located in one place, or it may be distributed to multiple network units. Some or all of the units may be selected according to actual needs to achieve the purpose of the solution of this embodiment.

Further, the functional units in each embodiment of the present disclosure may be integrated in a processing unit, or each unit may exist alone physically, or two or more units may be integrated in one unit. The foregoing integrated unit may be implemented in the form of hardware, or in the form of a software functional unit.

The integrated unit may be stored in a computer readable storage medium if it is implemented in the form of a software functional unit and sold or used as an independent product. Based on this understanding, the technical solution of the present disclosure essentially or the part that contributes to the existing technology or all or part of the technical solution may be embodied in the form of a software product, and the computer software product is stored in a storage medium, including several instructions to make a computer device (which may be a personal computer, a server, a network device, etc.) implement all or some of the acts of various methods described in embodiments of the present disclosure. The foregoing storage medium includes U disk, Read-Only Memory (ROM), Random Access Memory (RAM), mobile hard disk, magnetic disk or CD-ROM and other media that can store program codes.

The above are only the example implementations of the present disclosure. It should be noted that those of ordinary skill in the art may make several improvements and modifications without departing from the principle of the present disclosure and these improvements and modifications should also be considered to be in the scope of protection of the present disclosure.

The present disclosure may further be understood with clauses as follows:

Clause 1. A data transmission system, comprising:
a transmission terminal, used for transmitting a target data packet obtained by encrypting and encapsulating a data flow;
a network controller, deployed in a first Internet network and storing routing information from the transmission terminal to a receiving terminal; and
a backbone transmission network device, deployed in a backbone transmission network and used for obtaining the routing information and the target data packet forwarded by the first Internet network and forwarding the target data packet to the receiving terminal based on the routing information.

Clause 2. The system according to clause 1, further comprising:
a first access gateway, deployed in the first Internet network and used for receiving the target data packet transmitted by the transmission terminal.

Clause 3. The system according to clause 2, wherein,
a network address of the first access gateway is stored in the network controller, and the network controller is further used for transmitting the network address of the first access gateway to the transmission terminal; and
the transmission terminal transmits the target data packet to the first access gateway according to the network address of the first access gateway.

Clause 4. The system according to clause 3, wherein,
at least two first access gateways are deployed in the first Internet network and the transmission terminal transmits a test data packet to each first access gateway respectively to determine the time lag from the transmission terminal to each first access gateway; and
the transmission terminal transmits the target data packet to the first access gateway with the least time lag.

Clause 5. The system according to any of clauses 2 to 4, further comprising:
a first edge router, deployed in the first Internet network and used for receiving a target data packet forwarded by the first access gateway and forwarding the target data packet to the backbone transmission network device.

Clause 6. The system according to clause 5, wherein,
the network controller is further used for transmitting the routing information to the first access gateway, and the first access gateway forwards the target data packet and the routing information to the first edge router according to the routing information; and
the first edge router forwards the target data packet and the routing information to the backbone transmission network device according to the routing information.

Clause 7. The system according to clause 2, wherein the transmission terminal and the first access gateway are connected in any of the following ways: asymmetric digital subscriber line, Internet broadband, wireless network and 4G network.

Clause 8. The system according to clause 5, wherein the receiving terminal is a physical machine, and the system further comprises:
a second edge router, deployed in a second Internet network and used for receiving the target data packet forwarded by the backbone transmission network device and forwarding the target data packet to the second access gateway;
the second access gateway, deployed in the second Internet network and used for forwarding the target data packet to the receiving terminal; and
the receiving terminal, used for decrypting and decapsulating the target data packet to obtain the data flow.

Clause 9. The system according to clause 5, wherein the receiving terminal is a virtual machine deployed in a private cloud network,
a virtual router is further deployed in the private cloud network and is used for receiving the target data packet forwarded by the backbone transmission network device and forwarding the target data packet to the virtual machine.

Clause 10. The system according to clause 9, wherein,
a virtual switch is also deployed in the private cloud network and is used for receiving the target data packet forwarded by the virtual router and forwarding the target data packet to the virtual machine.

Clause 11. A data transmission method, comprising the acts of:
a backbone transmission network device obtaining through a first Internet network a target data packet transmitted by a transmission terminal, wherein the target data packet is obtained by the transmission terminal by encrypting and encapsulating a data flow;
the backbone transmission network device obtaining routing information from the transmission terminal to a receiving terminal transmitted by a network controller, wherein the network controller is deployed in the first Internet network; and
the backbone transmission network device forwarding the target data packet to the receiving terminal based on the routing information.

Clause 12. The method according to clause 11, wherein the step of a backbone transmission network device obtaining through a first Internet network a target data packet transmitted by a transmission terminal comprises:
the backbone transmission network device obtaining the target data packet forwarded by a first edge router, wherein the target data packet is transmitted by the transmission terminal to a first access gateway and forwarded by the first access gateway to the first edge router, wherein the first access gateway and the first edge router are deployed in the first Internet network.

Clause 13. The method according to clause 11, wherein the receiving terminal is a physical machine and the step of the backbone transmission network device forwarding the target data packet to the receiving terminal based on the routing information comprises:
the backbone transmission network device forwarding the target data packet to a second edge router through a second Internet network based on the routing information, wherein the target data packet is forwarded by the second edge router to a second access gateway, forwarded by the second access gateway to the receiving terminal and decrypted and decapsulated by the receiving terminal to obtain the data flow, and the second access gateway and the second edge router are deployed in the second Internet network.

Clause 14. The method according to clause 11, wherein the receiving terminal is a virtual machine deployed in a private cloud network and the step of the backbone transmission network device forwarding the target data packet to the receiving terminal based on the routing information comprises:

the backbone transmission network device forwarding the target data packet to a virtual router through the private cloud network, wherein the target data packet is forwarded by the virtual router to the virtual machine, and the virtual router is deployed in the private cloud network.

Clause 15. A data transmission method, comprising the acts of:

a transmission terminal obtaining a data flow;

the transmission terminal encrypting and encapsulating the data flow to obtain a target data packet;

the transmission terminal transmitting the target data packet to a backbone transmission network device through a first Internet network, wherein the backbone transmission network device forwards the target data packet to the receiving terminal based on routing information from the transmission terminal to the receiving terminal transmitted by a network controller, and the network controller is deployed in the first Internet network.

Clause 16. The method according to clause 15, wherein the step of the transmission terminal transmitting the target data packet to a backbone transmission network device through a first Internet network comprises:

the transmission terminal transmitting the target data packet to a first access gateway, and forwarding the target data packet to the backbone transmission network device through a first edge router, wherein the first access gateway and the first edge router are deployed in the first Internet network.

Clause 17. The method according to clause 16, wherein the step of the transmission terminal transmitting the target data packet to a first access gateway comprises:

the transmission terminal obtaining a network address of the first access gateway transmitted by the network controller; and the transmission terminal transmitting the target data packet to the first access gateway according to the network address of the first access gateway.

Clause 18. The method according to clause 17, wherein at least two first access gateways are deployed in the first Internet network and the method further comprises the acts of:

the transmission terminal transmitting a test data packet to each first access gateway respectively to determine the time lag from the transmission terminal to each first access gateway; and the transmission terminal transmitting the target data packet to the first access gateway with the least time lag.

Clause 19. A storage medium, including a stored program, wherein when the program is running, a device where the storage medium is located is controlled to perform the following acts: obtaining through a first Internet network a target data packet transmitted by a transmission terminal, wherein the target data packet is obtained by the transmission terminal by encrypting and encapsulating a data flow; obtaining routing information from the transmission terminal to a receiving terminal transmitted by a network controller, wherein the network controller is deployed in the first Internet network; and forwarding the target data packet to the receiving terminal based on the routing information.

Clause 20. A processor, used for running a program, wherein when the program is running, the following acts are performed: obtaining through a first Internet network a target data packet transmitted by a transmission terminal, wherein the target data packet is obtained by the transmission terminal by encrypting and encapsulating a data flow; obtaining routing information from the transmission terminal to a receiving terminal transmitted by a network controller, wherein the network controller is deployed in the first Internet network; and forwarding the target data packet to the receiving terminal based on the routing information.

Clause 21. A data processing system, comprising:

a processor; and a memory, connected to the processor and used for providing the processor with instructions for performing the following processing acts: obtaining through a first Internet network a target data packet transmitted by a transmission terminal, wherein the target data packet is obtained by the transmission terminal by encrypting and encapsulating a data flow; obtaining routing information from the transmission terminal to a receiving terminal transmitted by a network controller, wherein the network controller is deployed in the first Internet network; and forwarding the target data packet to the receiving terminal based on the routing information.

What is claimed is:

1. A method comprising:

obtaining, by a backbone transmission network device, through a first network a target data packet transmitted by a transmission terminal;

obtaining, by the backbone transmission network device, routing information from the transmission terminal to a receiving terminal transmitted by a network controller, the receiving terminal is a virtual machine deployed in a private cloud network; and forwarding, by the backbone transmission network device, the target data packet to the receiving terminal based on the routing information, the forwarding the target data packet to the receiving terminal based on the routing information including forwarding the target data packet to a virtual router through the private cloud network.

2. The method according to claim 1, wherein the target data packet is obtained by the transmission terminal by encrypting and encapsulating a data flow.

3. The method according to claim 1, wherein the network controller is deployed in the first network.

4. The method according to claim 1, wherein the first network is a first Internet network.

5. The method according to claim 1, wherein the obtaining through the first network the target data packet transmitted by the transmission terminal comprises:

obtaining the target data packet forwarded by a first edge router.

6. The method according to claim 5, wherein the target data packet is transmitted by the transmission terminal to a first access gateway and forwarded by the first access gateway to the first edge router.

7. The method according to claim 6, wherein the first access gateway and the first edge router are deployed in the first network.

8. The method according to claim 1, wherein:
the receiving terminal is a physical machine; and
the forwarding the target data packet to the receiving terminal based on the routing information further comprises:
forwarding the target data packet to a second edge router through a second Internet network based on the routing information.

9. The method according to claim 8, wherein the target data packet is forwarded by the second edge router to a second access gateway, forwarded by the second access gateway to the receiving terminal, and decrypted and decapsulated by the receiving terminal to obtain a data flow.

10. The method according to claim 9, wherein the second access gateway and the second edge router are deployed in the second Internet network.

11. The method according to claim 1, wherein the target data packet is forwarded by the virtual router to the virtual machine.

12. The method according to claim 1, wherein the virtual router is deployed in the private cloud network.

13. A transmission terminal comprising:
one or more processors; and
one or more memories storing thereon computer-readable instructions that, when executed by the one or more processors, cause the one or more processors to perform acts comprising:
obtaining a data flow;
encrypting and encapsulating the data flow to obtain a target data packet; and
transmitting the target data packet to a backbone transmission network device through a first network, wherein the backbone transmission network device forwards the target data packet to a receiving terminal based on routing information from the transmission terminal to the receiving terminal transmitted by a network controller, and the network controller is deployed in the first network, the transmitting the target data packet to the backbone transmission network device through the first network including transmitting the target data packet to a first access gateway, the transmitting the target data packet to the first access gateway including:
obtaining a network address of the first access gateway transmitted by the network controller; and
transmitting the target data packet to the first access gateway according to the network address of the first access gateway.

14. The transmission terminal according to claim 13, wherein the transmitting the target data packet to a backbone transmission network device through the first network further comprises:
forwarding the target data packet to the backbone transmission network device through a first edge router, wherein the first access gateway and the first edge router are deployed in the first network.

15. The transmission terminal according to claim 13, wherein:
at least two first access gateways are deployed in the first network; and
the method further comprises:
transmitting a test data packet to the at least two first access gateways respectively to determine a time lag from the transmission terminal to a respective first access gateway; and
transmitting the target data packet to the first access gateway with a least time lag.

16. The transmission terminal according to claim 13, wherein the first network is a first Internet network.

17. One or more memories storing thereon computer-readable instructions that, when executed by one or more processors, cause the one or more processors to perform acts comprising:
obtaining, by a backbone transmission network device, through a first Internet network a target data packet transmitted by a transmission terminal, wherein the target data packet is obtained by the transmission terminal by encrypting and encapsulating a data flow;
obtaining, by the backbone transmission network device, routing information from the transmission terminal to a receiving terminal transmitted by a network controller, the receiving terminal is a virtual machine deployed in a private cloud network; and
forwarding, by the backbone transmission network device, the target data packet to the receiving terminal based on the routing information, the forwarding the target data packet to the receiving terminal based on the routing information including forwarding the target data packet to a virtual router through the private cloud network.

18. The one or more memories according to claim 17, wherein the target data packet is obtained by the transmission terminal by encrypting and encapsulating a data flow.

19. The one or more memories according to claim 17, wherein the network controller is deployed in a first network.

20. The one or more memories according to claim 19, wherein the first network is a first Internet network.

* * * * *